United States Patent
Nishio et al.

(10) Patent No.: US 12,428,696 B2
(45) Date of Patent: Sep. 30, 2025

(54) COLD-ROLLED STEEL SHEET AND METHOD FOR PRODUCING SAME

(71) Applicant: NIPPON STEEL CORPORATION, Tokyo (JP)

(72) Inventors: Takuya Nishio, Tokyo (JP); Ryosuke Nakamura, Tokyo (JP); Masafumi Azuma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 726 days.

(21) Appl. No.: 17/766,066

(22) PCT Filed: Oct. 9, 2020

(86) PCT No.: PCT/JP2020/038358
§ 371 (c)(1),
(2) Date: Apr. 1, 2022

(87) PCT Pub. No.: WO2021/070951
PCT Pub. Date: Apr. 15, 2021

(65) Prior Publication Data
US 2022/0333221 A1    Oct. 20, 2022

(30) Foreign Application Priority Data

Oct. 10, 2019   (JP) ................. 2019-186743
Oct. 10, 2019   (JP) ................. 2019-186957

(51) Int. Cl.
*C21D 9/46* (2006.01)
*C21D 1/18* (2006.01)
(Continued)

(52) U.S. Cl.
CPC ............ *C21D 9/46* (2013.01); *C21D 1/18* (2013.01); *C21D 6/004* (2013.01); *C21D 6/005* (2013.01);
(Continued)

(58) Field of Classification Search
CPC ................ C22C 38/02; C22C 38/04
See application file for complete search history.

(56) References Cited

U.S. PATENT DOCUMENTS

| | | | |
|---|---|---|---|
| 2008/0000555 A1 | 1/2008 | Nonaka et al. | |
| 2018/0202016 A1* | 7/2018 | Yokoyama | ............ C22C 38/02 |
| 2019/0330721 A1 | 10/2019 | Hayashi et al. | |

FOREIGN PATENT DOCUMENTS

| | | |
|---|---|---|
| EP | 3 318 652 A1 | 5/2018 |
| JP | 2006-104532 A | 4/2006 |

(Continued)

*Primary Examiner* — Jophy S. Koshy
*Assistant Examiner* — Joshua S Carpenter
(74) *Attorney, Agent, or Firm* — Birch, Stewart, Kolasch & Birch, LLP

(57) ABSTRACT

A cold-rolled steel sheet has a predetermined chemical composition; a structure of the told-rolled steel sheet at a position which is ¼ of a sheet thickness from a surface contains, in a volume percentage, 80.0% or more of tempered martensite, more than 2.5% and less than 10.0% of residual austenite, 0% or more and 15.0% or less of ferrite and bainite in total, 0% or more and 3.0% or less of martensite, and the remainder structure. With respect to the above-described structure, a maximum value of a random specific intensity Iq is 4.0 or less, an average diameter of a region Rq which has an orientation within 10° from a crystal orientation in which the random specific intensity Iq is maximum is 10.0 μm or less, a surface density of the region Rq is 1000 pieces/mm² or more, a tensile strength is 1310 MPa or more, a uniform elongation is 5.0% or more, and TS×λ is 35000 MPa·% or more.

20 Claims, 6 Drawing Sheets

(51) Int. Cl.

| | | |
|---|---|---|
| C21D 6/00 | (2006.01) | |
| C21D 8/02 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/22 | (2006.01) | |
| C22C 38/38 | (2006.01) | |
| C23C 2/02 | (2006.01) | |
| C23C 2/28 | (2006.01) | |
| C23C 2/40 | (2006.01) | |

(52) U.S. Cl.
CPC ........... *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/38* (2013.01); *C23C 2/02* (2013.01); *C23C 2/0224* (2022.08); *C23C 2/024* (2022.08); *C23C 2/28* (2013.01); *C23C 2/40* (2013.01)

(56) References Cited

FOREIGN PATENT DOCUMENTS

| | | |
|---|---|---|
| JP | 2007-277661 A | 10/2007 |
| JP | 2009-30091 A | 2/2009 |
| JP | 2010-215958 A | 9/2010 |
| WO | WO 2015/015239 A1 | 2/2015 |
| WO | WO 2018/055695 A1 | 3/2018 |

* cited by examiner

COLD-ROLLED STEEL SHEET AND METHOD FOR PRODUCING SAME

TECHNICAL FIELD

The present invention relates to a cold-rolled steel sheet and a method for producing the same.

Priority is claimed on Japanese Patent Application Nos. 2019-186743 and 2019-186957, filed Oct. 10, 2019, the content of which is incorporated herein by reference.

BACKGROUND ART

In recent years, the industrial technology fields have become high divided and the materials used in each technology field are required to have special and high performance. Particularly, with regard to steel sheets for vehicles, in order to reduce the weight of a vehicle body and improve fuel efficiency in consideration of the global environment, demand for a high-tensile strength cold-rolled steel sheet having a thin sheet thickness and excellent formability is increasing significantly. Among steel sheets for vehicles, particularly, cold-rolled steel sheets used for vehicle body frame parts are required to have high strength and also high formability for expanding applications. Examples of the characteristics required for steel sheets for vehicles are a tensile strength (TS) of 1310 MPa or more, a uniform elongation of 5.0% or more, and a TS×λ (hole expansion) of 35,000 MPa·% or more. Alternatively, it may be required that a ratio (R/t) of a limit bending R at a 90° V bending to a sheet thickness t is 5.0 or less and that excellent hydrogen embrittlement resistance characteristics are provided, in accordance with a treatment method and applied parts.

Although it is effective to have a structure including ferrite to secure ductility such as a uniform elongation, in order to obtain a strength of 1310 MPa or more in a structure including ferrite, it is necessary to harden a second phase. However, the hard second phase deteriorates the hole expandability and the bendability.

On the other hand, as a technique for improving the hole expandability, the bendability, and the hydrogen embrittlement resistance characteristics of high-strength steel sheets, steel sheets including tempered martensite as a main phase have been proposed (refer to, for example. Patent Documents 1 and 2). Patent Documents 1 and 2 describe that a microstructure is a tempered martensite single-phase structure, which has excellent hole expandability, bendability, and hydrogen embrittlement resistance characteristics.

However, in the invention of Patent Document 1, a tensile strength is as low as less than 1310 MPa. For this reason, in the case of aiming for higher strength, it is necessary to further improve the workability, the bendability, and the hydrogen embrittlement resistance characteristics which deteriorate with high-strengthening. Furthermore, although high strength of 1310 MPa or more can be achieved in the invention of Patent Document 2, the steel sheet cools immediately to room temperature in cooling during quenching. Thus, there is a problem that a small volume percentage of residual austenite is provided and a high uniform elongation cannot be obtained.

Also, Patent Document 3 proposes a steel sheet in which the TRIP effect of residual austenite is utilized as a technique for achieving both high strength and high formability.

However, it is difficult to obtain a high strength of 1310 MPa or more because the steel sheet of Patent Document 3 has a ferrite phase, and hole expansion formability and bendability deteriorate due to a difference in strength in the structure.

PRIOR ART DOCUMENTS

Patent Documents

[Patent Document 1]
Japanese Unexamined Patent Application, First Publication No. 2009-30091

[Patent Document 2]
Japanese Unexamined Patent Application, First Publication No. 2010-215958

[Patent Document 3]
Japanese Unexamined Patent Application, First Publication No. 2006-104532

SUMMARY OF THE INVENTION

Problems to be Solved by the Invention

As described above, in the related art, a steel sheet having a tensile strength (TS) with a high strength of 1310 MPa or more and high formability, and preferably a steel sheet further having bendability and hydrogen embrittlement resistance characteristics has not been proposed.

The present invention was made to solve the above-described problems, and an object of the present invention is to provide a high-strength steel sheet having excellent formability which is a problem in a high-strength steel sheet and a method for producing the same. In the present invention, high strength means that a tensile strength (TS) is 1310 MPa or more and excellent formability means that a uniform elongation is 5.0% or more and TS×λ (hole expansion) is 35000 MPa·% or more.

A preferred object of the present invention is to provide a high-strength steel sheet having excellent formability which is a problem in a high-strength steel sheet and sufficient bendability and hydrogen embrittlement resistance characteristics and a method for producing the same. In the present invention, excellent bendability means that a ratio (R/t) of a limit bending R to a sheet thickness at a 90° V bending is 5.0 or less.

In the present invention, a cold-rolled steel sheet includes a hot-dip galvanized steel sheet having a hot-dip galvanized layer on a surface and a hot-dip galvannealed steel sheet having a hot-dip galvannealed layer on a surface.

Means for Solving the Problem

The inventors of the present invention have carried out a detailed investigation on the effects of a chemical composition and production conditions which affect mechanical properties of a high-strength cold-rolled steel sheet. As a result, it was found that both strength and formability can be achieved at a high level by controlling a texture inside a steel sheet (for example, at a position of ¼ of a sheet thickness from a surface) in a state in which a metallographic structure is a structure mainly composed of tempered martensite and including a predetermined amount or more of residual austenite. Furthermore, it was found that, when cold rolling with a cumulative rolling reduction ratio of 60% or less is performed in a state in which the hot rolling conditions are controlled, and then, when heating is performed at an average heating rate of 1.0° C./s or higher and 50° C./s or lower from 550° C. to 750° C. and annealing is performed to perform soaking in a γ single phase region, recrystallization during annealing can be suppressed and reverse transformation can be promoted, and as a result, a random texture advantageous for formability can be obtained.

Also, it was found as a result of studies by the inventors of the present invention that, when a texture of a surface layer portion is controlled in addition to the above contra both bendability and hydrogen embrittlement resistance characteristics can be obtained at a high level in addition to strength and formability.

The present invention was made on the basis of the above findings. The gist of the present invention is as follows.

The present invention was made on the basis of the above findings. The gist of the present invention is as follows.

[1] A cold-rolled steel sheet according to an aspect of the present invention has a chemical composition of, in % by mass, C: more than 0.140% and less than 0.400%; Si: more than 0.35% and less than 1.50%; Mn: more than 1.30% and less than 3.50%; P: 0.100% or less; S: 0.010% or less; Al: 0.100% or less; N: 0.0100% or less; Ti: 0% or more and less than 0.050%; Nb: 0% or more and less than 0.050%; V: 0% or more and 0.50% or less; Cu: 0% or more and 1.00% or less; Ni: 0% or more and 1.00% or less; Cr: 0% or more and 1.00% or less; Mo: 0% or more and 0.50% or less; B: 0% or more and 0.0100% or less; Ca: 0% or more and 0.0100% or less; Mg: 0% or more and 0.0100% or less; REM: 0% or more and 0.0500% or less; Bi: 0% or more and 0.050% or less; with the balance of Fe and impurities, wherein a structure at a position of ¼ of a sheet thickness from a surface contains, in volume percentage, 80.0% or more of tempered martensite; more than 2.5% and less than 10.0% of residual austenite; 0% or more and 15.0% or less in total of ferrite and bainite; 0% or more and 3.0% or less of martensite, and the remainder structure, in the structure, a maximum of a random specific intensity Iq is 4.0 or less, an average diameter of a region Rq which has an orientation within 10° from a crystal orientation in which the random specific intensity Iq is maximized is 10.0 μm or less, a planar density of the region Rq is 1000 pieces/mm² or more, a tensile strength is 1310 MPa or more, a uniform elongation is 5.0% or more, and TS×λ is 35,000 MPa·% car more.

[2] In the cold-rolled steel sheet set forth in above [1], in a structure within a range from the surface to 100 μm in a sheet thickness direction, a maximum of a random specific intensity Is may be 4.0 or less, an average diameter of a region Rs which has an orientation within 10° from a crystal orientation in which the random specific intensity Is maximized may be 10.0 μm or less, a planar density of the region Rs may be 1000 pieces/mm² or more, and R/t which is a ratio of a limit bending R at 90° V bending to a sheet thickness t may be 5.0 or less.

[3] In the cold-rolled steel sheet set forth in above [1] or [2], the tensile strength may be 1400 MPa or more.

[4] In the cold-rolled steel sheet set forth in any one of above [1] to [3], the chemical composition may contain, in % by mass, one or more selected from Ti: 0.001% or more and less than 0.050%; Nb: 0.001% or more and less than 0.050%; V: 0.01% or more and 0.50% or less; Cr: 0.01% or more and 1.00% or less; Ni: 0.01% or more and 1.00% or less; Cu: 0.01% or more and 1.00% or less; Mo: 0.01% or more and 0.50% or less; B: 0.0001% or more and 0.0100% or less; Ca: 0.0001% or more and 0.0100% or less; Mg: 0.0001% or more and 0.0100% or less; REM: 0.0005%% or more and 0.0500% or less; and Bi: 0.0005%% or more and 0.050% or less.

[5] In the cold-rolled steel sheet set forth in any one of above [1] to [4], the cold-rolled steel sheet may include: a hot-dip galvanized layer on the surface.

[6] In the cold-rolled steel sheet set forth in the above [5], the hot-dip galvanized layer may be a hot-dip galvannealed layer.

[7] A method for producing a cold-rolled steel sheet according to another aspect of the present invention includes: a hot rolling step of directly heating or once cooling and then heating a cast slab having a chemical composition which contains, in % by mass, C: more than 0.140% and less than 0.400%, Si: more than 0.35% and less than 1.50%, Mn: more than 1.30% and less than 3.50%, P: 0.100% or less, S: 0.010% or less, Al: 0.100% or less, N: 0.0100% or less, Ti: 0% or more and less than 0.050%, Nb: 0% or more and less than 0.050%, V: 0% or more and 0.50% or less, Cr: 0% or more and 1.00% or less, Ni: 0% or more and 1.00% or less, Cu: 0% or more and 1.00% or less, Mo: 0% or more and 0.50% or less, B: 0% or more and 0.0100% or less, Ca: 0% or more and 0.0100% or less, Mg: 0% or more and 0.0100% or less, REM: 0% or more and 0.0500% or less, and Bi: 0% or more and 0.050% or less, with the balance of Fe and impurities, and then heating the cast slab to 1100° C. or higher, and subjecting the cast slab to hot rolling under the conditions in which a rolling temperature FT in a final stand is 920° C. or higher and a rolling reduction ratio is 15% or less to obtain a hot-rolled steel sheet; a cooling step of cooling the hot-rolled steel sheet so that the hot-rolled steel sheet passes in a temperature range of 750° C. to 650° C. within 10 seconds; a coiling step of coiling the hot-rolled steel sheet which has been subjected to the cooling step at 650° C. or lower; a cold rolling step of subjecting the hot-rolled steel sheet which has been subjected to the coiling step to pickling and subjecting the hot-rolled steel sheet to cold rolling at a cumulative rolling reduction ratio of 60% or less to obtain a cold-rolled steel sheet; an annealing step of heating the cold-rolled steel sheet at an average heating rate of 1.0° C./s or higher and 50.0° C./s or lower from 550° C. to 750° C. and subjecting the cold-rolled steel sheet to soaking at 820° C. or higher; an cooling after annealing step of cooling the cold-rolled steel sheet which has been subjected to the annealing step to a temperature of 50° C. or higher and 250° C. or lower so that an average cooling rate in a temperature range of 700° C. to 600° C. and a temperature range of 450° C. to 350° C. is 5° C. or higher; and a tempering step of tempering the cold-rolled steel sheet which has been subjected to the cooling after annealing step in a temperature range of 200° C. or higher and lower than 350° C. for 1 second or longer.

[8] In the method for producing a cold-rolled steel sheet set forth in the above [7], in the hot rolling step, the hot rolling may be performed under the conditions in which the rolling temperature FT in the final stand is 920° C. or higher and 960° C. or lower, the rolling reduction ratio is 10% or more and 15% or less, and a friction coefficient μ is 0.15 or more; and in the annealing step, the cold-rolled steel sheet may be heated at an average heating rate of 3.0° C./s or higher and 50.0° C./s or lower from 550° C. to 750° C. and the cold-rolled steel sheet may be subjected to soaking at 820° C. or higher.

[9] In the method for producing a cold-rolled steel sheet set forth in the above [7] or [8], in the cooling after annealing step, the cold-rolled steel sheet which has been subjected to the annealing step may be cooled to a temperature of 50° C. or higher and lower than 220° C. so that an average cooling rate in a temperature range of 700° C. to 600° C. and a temperature range from 450° C. to 350° C. is 5° C./s or higher.

[10] In the method for producing a cold-rolled steel sheet set forth in any one of the above [7] to [9], the chemical composition may contain, in % by mass, one or more selected from Ti: 0.001% or more and less than 0.050%, Nb: 0.001% or more and less than 0.050%, V: 0.01% or more and 0.50% or less, Cr: 0.01% or more and 1.00% or less, Ni: 0.01% or more and 1.00% or less, Cu: 0.01% or more and 1.00% or less, Mo: 0.01% or more and 0.50% or less, B: 0,0001% or more and 0.0100% or less, Ca: 0.0001% or more and 0.0100% or less, Mg: 0.0001% or more and 0.0100% or less, REM: 0.0005%% or more and 0.0500% or less, and Bi: 0.0005%% or more and 0.050% or less.

[11] In the method for producing a cold-milled steel sheet set forth in any one of the above [7] to [10], the cooling after annealing step may further include: subjecting the steel sheet to hot dip galvanizing in a temperature range of higher than 450° C. and lower than 600° C. and optionally subjecting the steel sheet to an alloy treatment.

Effects of the Invention

According to the above aspect of the present invention, it is possible to obtain a cold-rolled steel sheet having high-strength and excellent formability, in which a tensile strength (TS) of 1310 MPa or more, a uniform elongation of 5.0% or more, TS×λ of 35000 MPa·% or more, and a method for producing the same. Such a steel sheet has sufficient formability which can be applied to a treatment such as press molding. For this reason, the present invention contributes to the development of industry such as being able to contribute to solving global environmental problems by reducing a weight of a vehicle body of a vehicle.

Also, according to a preferred embodiment of the present invention, it is possible to obtain a cold-rolled steel sheet having a tensile strength (TS) of 1310 MPa or more, a uniform elongation of 5.0% or more, TS×λ is 35,000 MPa·% or more, a ratio (R/t) of a limit bending R to a sheet thickness t at a 90° V bending being 5.0 or less, and excellent hydrogen embrittlement resistance characteristics and a method for producing the same. Such a steel sheet has sufficient formability which can be applied to a treatment such as press molding and excellent hydrogen embrittlement resistance characteristics. For this reason, the present invention contributes to the development of industry such as being able to contribute to solving global environmental problems by reducing a weight of a vehicle body of a vehicle.

BRIEF DESCRIPTION OF DRAWINGS

In FIG. 1, ○ is a steel sheet with TS×λ≥35000 MPa·% and x is a steel sheet of TS×λ<35000 MPa·%, at a position of ¼ of a sheet thickness from a surface.

In FIG. 2, ○ is a steel sheet of TS×λ≥35000 MPa·% and x is a steel sheet of TS×λ<35000 MPa·%, at a position of ¼ of a sheet thickness from a surface.

In FIG. 3, ○ is a steel sheet with a random specific intensity of a texture≤4.0 and x is a steel sheet with a random specific intensity of a texture>4.0.

In FIG. 4, ○ is a steel sheet having a diameter of a region with an orientation within 10° from a crystal orientation in which a random specific intensity is maximized≤10 μm and a planar density≥1000 pieces/mm² and x is a steel sheet having a diameter of a region with an orientation within 10° from a crystal orientation in which a random specific intensity is maximized>10 μm and a planar density<1000 pieces/mm².

In FIG. 5, ○ is a steel sheet having good hydrogen embrittlement resistance characteristics and x is a steel sheet having poor hydrogen embrittlement resistance characteristics.

In FIG. 6, ○ is a steel sheet having good hydrogen embrittlement resistance characteristics and x is a steel sheet having poor hydrogen embrittlement resistance characteristics.

In FIG. 7, ○ is a steel sheet having a random specific intensity of a texture≤4.0 and x is a steel sheet having a random specific intensity of a texture>4.0.

In FIG. 8, ○ is a steel sheet having a diameter of a region with an orientation within 10° from a crystal orientation in which a random specific intensity is maximized≤10 μm and a planar density≥1000 pieces/mm² and x is a steel sheet having a diameter of a region with an orientation within 10° from a crystal orientation which a random specific intensity is maximized>10 μm and a planar density<1000 pieces/mm².

EMBODIMENT(S) OF THE INVENTION

Figure 1:
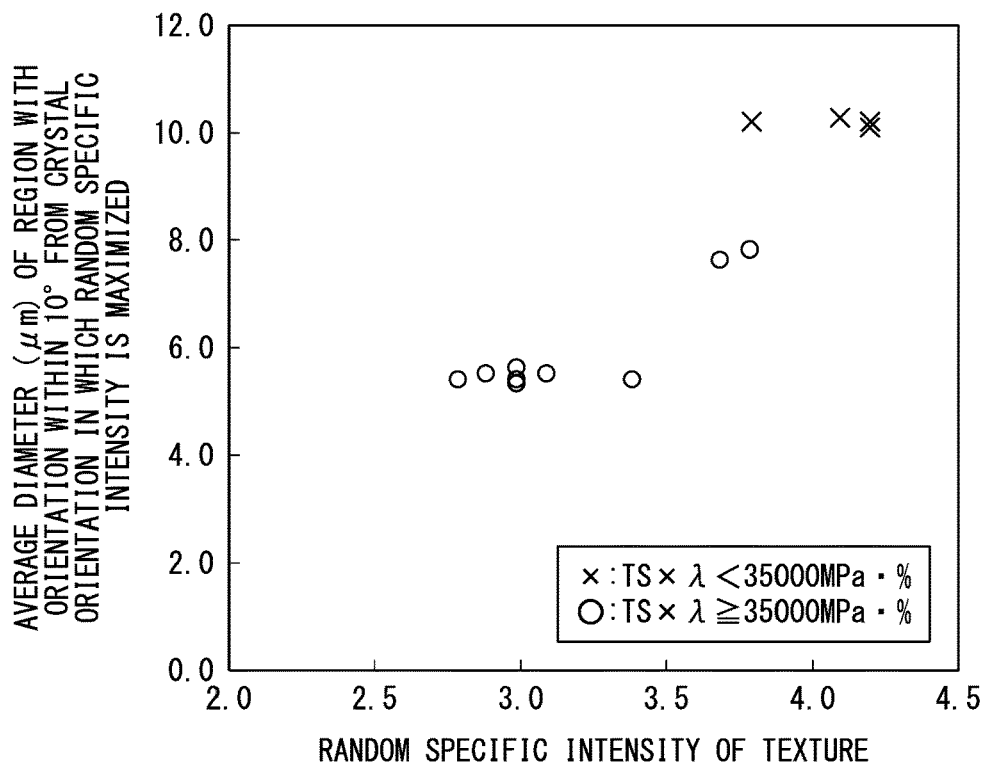
FIG. 1 is a diagram showing a relationship between a maximum of a random specific intensity of a texture and an average diameter of a region with an orientation within 10° from a crystal orientation in which the random specific intensity is maximized and TS×λ.
Figure 2:
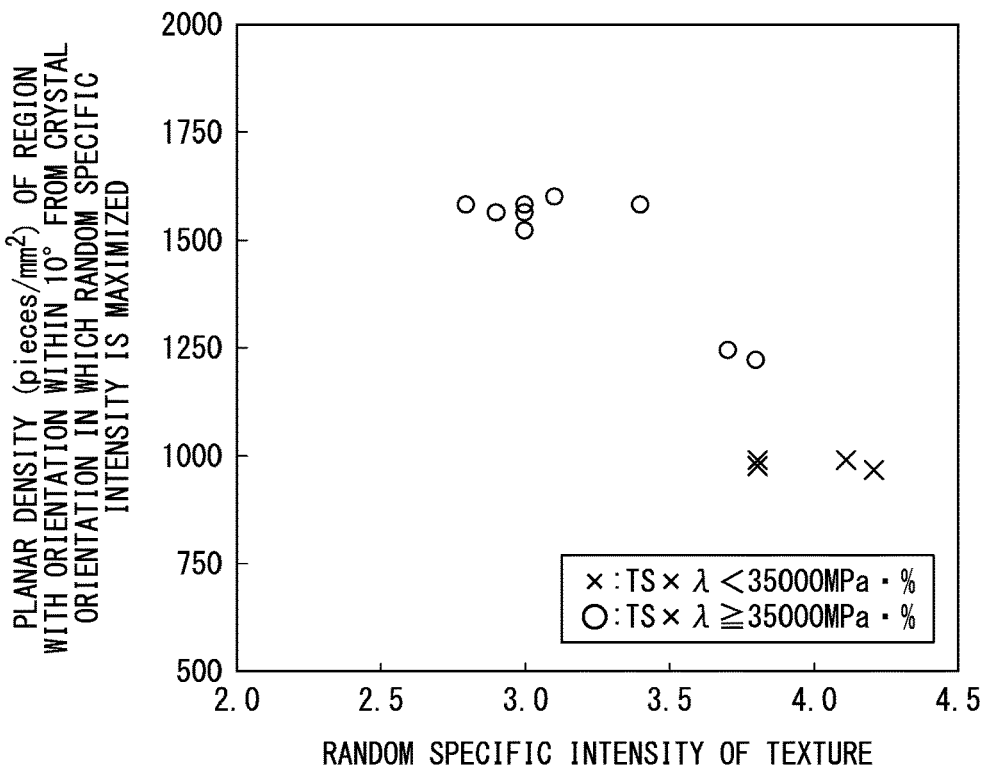
FIG. 2 is a diagram showing a relationship between a maximum of a random specific intensity of a texture and a planar density of a region with an orientation within 10° from a crystal orientation in which the random specific intensity is maximized and TS×λ.
Figure 3:
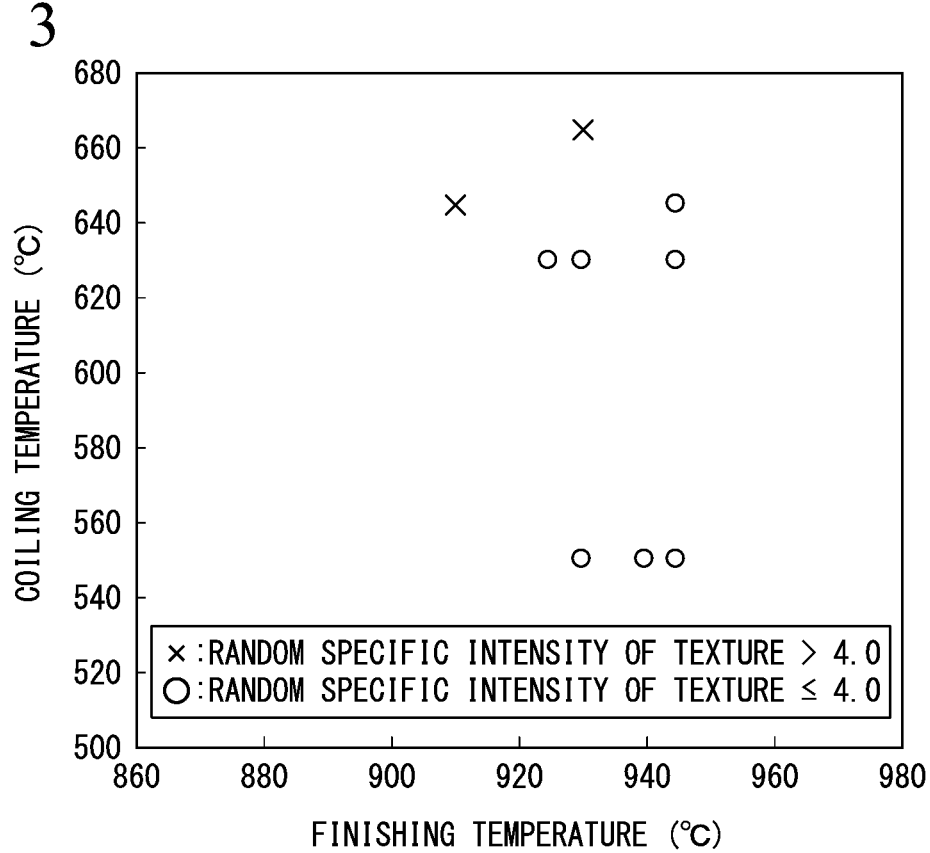
FIG. 3 is a diagram showing a relationship between a finishing temperature and a coiling temperature of hot rolling and a random specific intensity of a texture at a position of ¼ of a sheet thickness from a surface.
Figure 4:
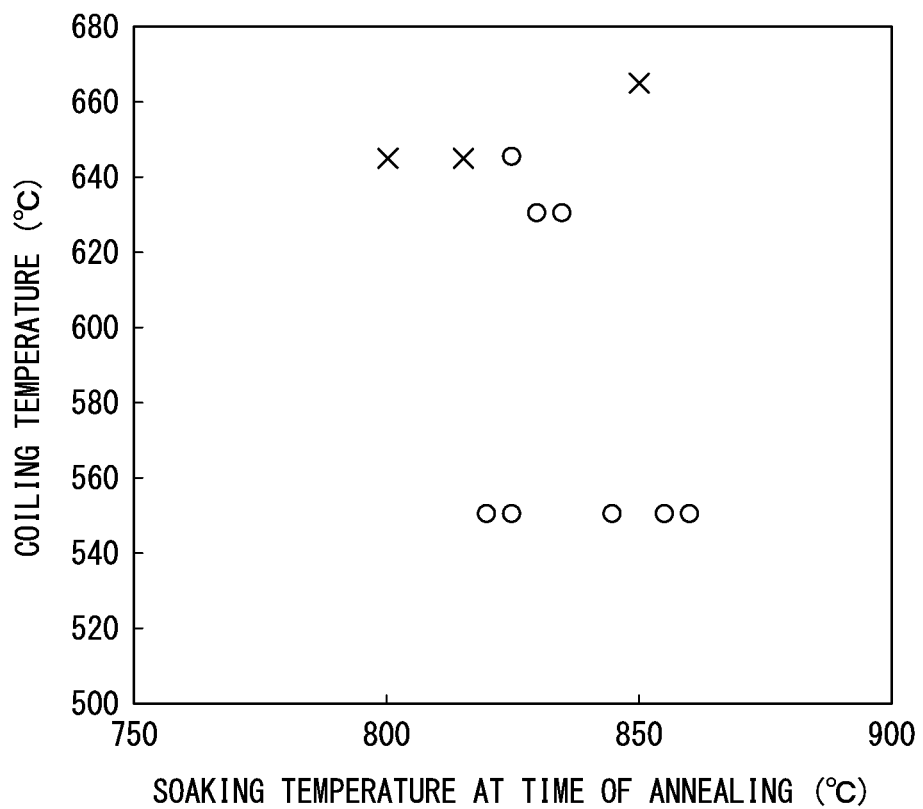
FIG. 4 is a diagram showing a relationship between a soaking temperature and a coiling temperature during annealing and a diameter and a planar density of a region with an orientation within 10° from a crystal orientation in which a random specific intensity is maximized at a position of ¼ of a sheet thickness from surface.
Figure 5:
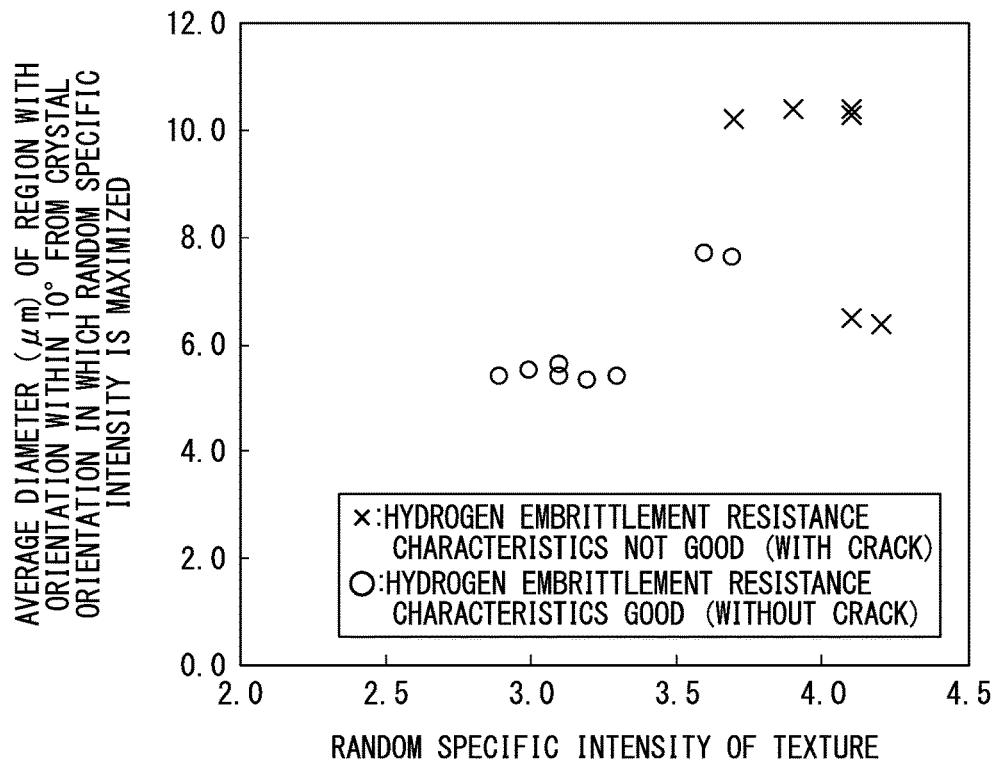
FIG. 5 is a diagram showing a relationship between a maximum of a random specific intensity of a texture of a surface layer portion and an average diameter of a region with an orientation within 10° from a crystal orientation in which the random specific intensity is maximized and hydrogen embrittlement resistance characteristics.
Figure 6:
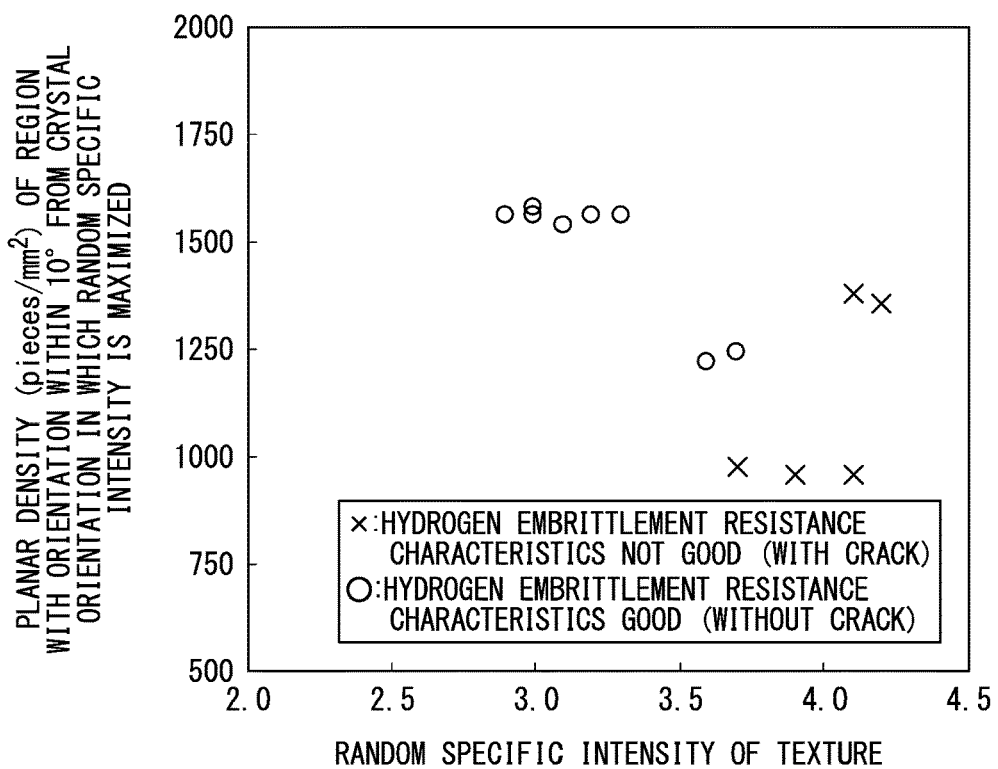
FIG. 6 is a diagram showing a relationship between a maximum of a random specific intensity and a planar density of a region with an orientation within 10° from a crystal orientation in which the random specific intensity is maximized and hydrogen embrittlement resistance characteristics, of a texture of a surface layer portion.
Figure 7:
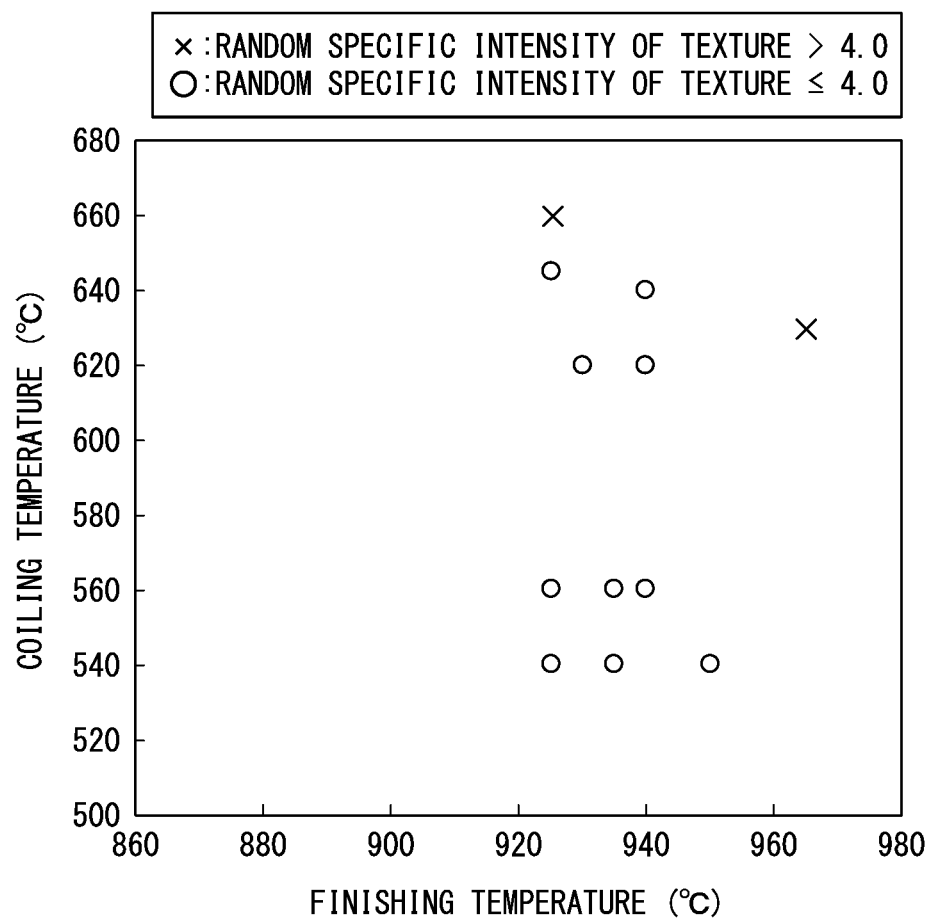
FIG. 7 is a diagram showing a relationship between a finishing temperature and a coiling temperature of hot rolling and a random specific intensity of a texture of a surface layer portion.
Figure 8:
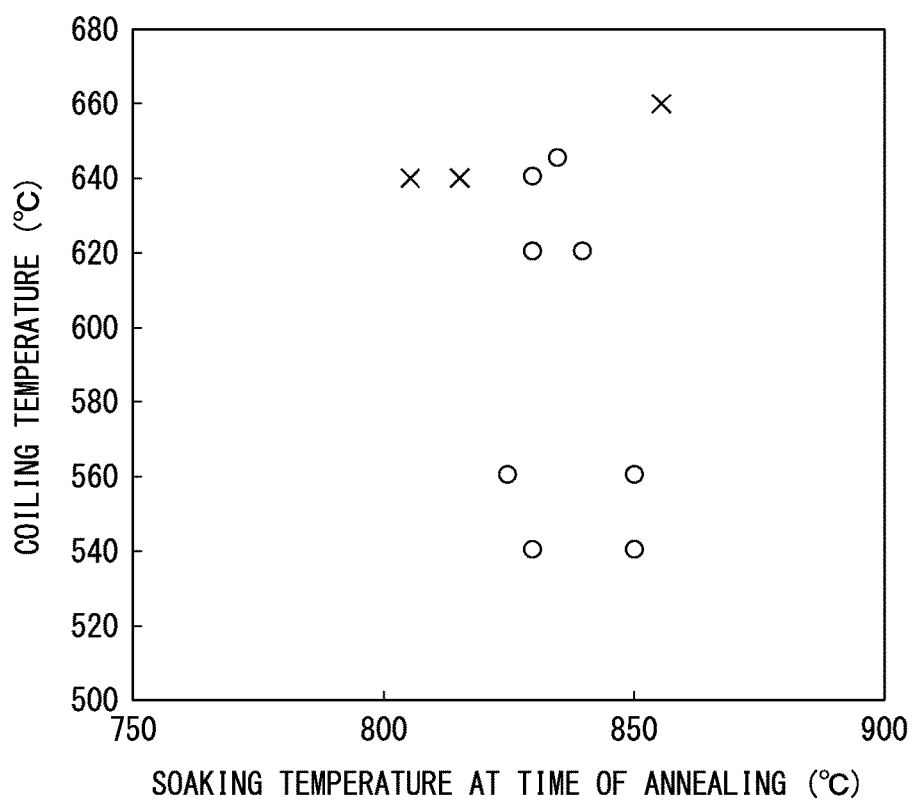
FIG. 8 is a diagram showing a relationship between a soaking temperature and a coiling temperature during annealing and a diameter and a planar density of a region with an orientation within 10° from a crystal orientation in which a random specific intensity is maximized of a surface layer portion.

A cold-rolled steel sheet according to an embodiment of the present invention (hereinafter may be referred to as a "steel sheet according to the embodiment" in some cases) will be described.

A metallographic structure and a chemical composition of a steel sheet and a production method capable of efficiently, stably, and economically producing the steel sheet according to the embodiment will be described below in detail. The steel sheet according to the embodiment is not only a cold-rolled steel sheet in which a plating layer is not provided on a surface, but also a hot-dip galvanized steel sheet having a hot-dip galvanized layer on a surface or a hot-dip galvannealed steel sheet having a hot-dip galvannealed plating on a surface. These main conditions are also common with hot-dip galvanized steel sheets and hot-dip galvannealed steel sheets.

1. Metallographic Structure (Microstructure)

First, a metallographic structure of a steel sheet according to the embodiment will be described.

In a description of the metallographic structure of the steel sheet according to the embodiment, a structure percentage is expressed as a volume percentage. Therefore, unless otherwise specified, "%" represents "% by volume."

In the steel sheet (including a cold-rolled steel sheet, a hot-dip galvanized steel sheet, and a hot-dip galvannealed steel sheet) according to the embodiment, the structure at the position of ¼ of the sheet thickness (¼ thickness) from the surface includes, in a volume percentage, 80.0% or more of tempered martensite, more than 2.5% and less than 10.0% of residual austenite, 0% or more and 15.0% or less in total of ferrite and bainite, and 0% or more and 3.0% or less of martensite.

<Tempered Martensite: 80.0% or More>

Tempered martensite is an aggregation of lath-shaped crystal grains, similar to martensite (so-called fresh martensite). On the other hand, unlike martensite, tempered martensite is a hard structure having fine iron-based carbides included therein due to tempering. Tempered martensite is obtained by tempering martensite produced through cooling or the like after annealing using heat treatment or the like.

Tempered martensite is a structure which is less brittle and more ductile than martensite. In the steel sheet according to the embodiment, in order to improve the strength, the hole expandability, the bendability, and the hydrogen embrittlement resistance characteristics, a volume percentage of tempered martensite is 80.0% or more. The volume percentage is preferably 85.0% or more. The volume percentage of tempered martensite is less than 97.5%.

<Residual Austenite: More than 2.5% and Less than 10.0%>

Residual austenite improves the ductility of the steel sheet through the TRIP effect and contributes to the improvement in uniformity of elongation. For this reason, the volume percentage of residual austenite is more than 2.5%. The volume percentage of residual austenite is preferably more than 3.5% and more preferably more than 4.5%.

On the other hand, if an excess volume percentage of residual austenite is provided, a particle size of residual austenite becomes large. Such residual austenite having a large particle size becomes coarse and hard martensite after deformation. In this case, starting points of cracks are likely to occur and hole expandability and bendability deteriorate. For this reason, the volume percentage of residual austenite is less than 10.0%. The volume percentage of residual austenite is preferably less than 8.0%©, and more preferably less than 7.0%.

<Ferrite and Bainite: 0% or More and 15.0% or Less in Total>

Ferrite is a soft phase obtained through two-phase region annealing or slow cooling after annealing. Although ferrite improves the ductility of the steel sheet when mixed with a hard phase such as martensite, it is necessary to limit the volume percentage of ferrite to achieve a high strength of 1310 MPa or more.

Also, bainite is a phase obtained by keeping the steel sheet at 350° C. or higher and 450° C. or lower for a certain period of time after annealing. Although bainite has an effect of improving ductility because bainite is soft relative to martensite, it is necessary to limit the volume percentage to achieve a high strength of 1310 MPa or more as in the case of ferrite described above.

Therefore, the volume percentage of ferrite and bainite is 15.0% or less in total. The volume percentage is preferably 10.0% or less. Since ferrite and bainite may not be provided, lower limits of each is 0%.

Also, since ferrite is soft relative to bainite, when a total volume percentage of ferrite and bainite is 15.0% or less, the volume percentage of ferrite is preferably less than 10.0% to achieve a high strength of 1310 MPa or more.

<Martensite: 0% or More and 3.0% Less>

Martensite (fresh martensite) is an aggregation of lath-shaped crystal grains formed through transformation from austenite during final cooling. Martensite is hard and brittle and easily becomes a crack starting point at the time of deformation. Therefore, if a large volume percentage of martensite is provided, the hole expandability and the bendability deteriorate. For this reason, the volume percentage of martensite is 3.0% or less. The volume percentage of martensite is preferably 2.0% or less, and more preferably 1.0% or less. A lower limit of martensite is 0% because martensite may not be provided.

In addition to the above, the structure at a position of ¼ of the sheet thickness from the surface may include pearlite as the remainder structure. However, pearlite is a structure having cementite in the structure thereof and consumes C (carbon) in steel which contributes to the improvement of strength. For this reason, if the volume percentage of pearlite is more than 5.0%, the strength of the steel sheet decreases. For this reason, the volume percentage of pearlite is preferably 5.0% or less. The volume percentage of pearlite is preferably 3.0% or less, and more preferably 1.0% or less.

The volume percentage in the structure at the position of ¼ of the sheet thickness from the surface of the steel sheet according to the embodiment is measured as follows.

That is to say, the volume percentages of ferrite, bainite, martensite, tempered martensite, and pearlite are observed using a SEM by sampling test pieces from arbitrary positions with respect to the rolling direction and a width direction of the steel sheet, polishing a vertical cross section parallel to the rolling direction, and observing a metallographic structure appearing at a position of ¼ of the sheet thickness (¼ thickness) from the surface through nital etching using the SEM. In SEM observation, five visual fields of a visual field of 30 μm×50 μm are observed at a magnification of 3000 times, an area percentage of each structure is measured from the observed images, and an average value thereof is calculated. There is no change in structure in a direction perpendicular to the rolling direction (the width direction of the steel sheet) and the area percentage of the vertical cross section parallel to the rolling direction is equal to the volume percentage. Thus, the area percentage obtained by observing the structure is taken as the volume percentage of each structure.

When the area percentage of each structure is measured, a region in which a substructure does not appear and a low brightness is provided is defined as ferrite. Furthermore, a region in which a substructure does not appear and a high brightness is provided is defined as martensite or residual austenite. In addition, a region in which a substructure appears is defined as tempered martensite or bainite.

Bainite and tempered martensite can be further distinguished through careful observation of the carbides in the grains.

To be specific, tempered martensite is composed of martensite lath and cementite formed inside the lath. At that time, since there are two or more types of crystal orientation relationships between martensite lath and cementite, cementite constituting tempered martensite has a plurality of variants. On the other hand, bainite is classified into upper bainite and lower bainite. Since upper bainite is composed of lath-shaped bainitic ferrite and cementite formed at a lath interface, bainitic ferrite and cementite can be easily distinguished from tempered martensite. Lower bainite is composed of lath-shaped bainitic ferrite and cementite formed inside the lath. At that time, the crystal orientation relationship between bainitic ferrite and cementite is one type unlike tempered martensite and cementite constituting lower bainite has the same variant. Therefore, lower bainite and tempered martensite can be distinguished on the basis of the cementite variant.

On the other hand, martensite and residual austenite cannot be clearly distinguished through SEM observation. For this reason, the volume percentage of martensite is calculated by subtracting the volume percentage of residual austenite calculated through a method which will be described later from the volume percentage of the structure determined to be martensite or residual austenite.

The volume percentage of residual austenite is quantified using a MoKα ray from a (200) and (210) plane integral intensity of ferrite and a (200), (220), and (311) plane integral intensity of austenite by sampling test pieces from an arbitrary position of the steel sheet and chemically polishing a rolled surface to a position of ¼ of the sheet thickness from the surface of the steel sheet.

2. Texture 2.1 Texture at Position of ¼ of Sheet Thickness from Surface

In the steel sheet according to the present embodiment (the steel sheet includes the cold-rolled steel sheet, the hot-dip galvanized steel sheet, and the hot-dip galvannealed steel sheet), the texture at the position of ¼ of the sheet thickness (¼ thickness) from the surface has a maximum of a random specific intensity (Iq) of 4.0 or less measured through a method which will be described later, an average diameter (average region diameter) of a region (Rq) of an orientation within 10° from a crystal orientation in which the random specific intensity (Iq) is maximized of 10.0 μm or less, and a planar density of the region (the region with the orientation within 10° from the crystal orientation in which the random specific intensity is maximized: Rq) of 1000 pieces/mm² or more.

<Maximum Random Specific Intensity: 4.0 or Less>

The steel sheet according to the embodiment has a metallographic structure which is mainly composed of tempered martensite, and as described above, control of the texture is effective in improving the hole expandability.

According to the investigation by the inventors of the present invention, randomization of the texture improves the hole expandability. Although a mechanism by which the texture affects the hole expandability is not clear, when the texture is strong or when a region in which a crystal orientation in the same orientation is coarse is present in the steel sheet, it is presumed that strain easily concentrates during working such as a hole expansion test and fracture easily occurs. That is to say, it is important that the texture is close to random. In the steel sheet according to the embodiment, a maximum of a random specific intensity (Iq) of the texture is 4.0 or less. More preferably, a maximum of a random specific intensity is 3.5 or less.

<Average Diameter of Region Having Orientation within 10° from Crystal Orientation in which Random Specific Intensity is Maximized is 10.0 μm or Less and Planar Density of the Region is 1000 Pieces/mm² or More>

In the steel sheet according to the embodiment, not only the maximum of the random specific intensity (Iq), but also the average region diameter of the region (Rq) having the orientation within 10° from the crystal orientation in which the random specific intensity is maximized is 10.0 μm or less, and the planar density of the region (Rq) having the orientation within 10° from the crystal orientation in which the random specific intensity (Iq) is maximized is 1000 pieces/mm² or more.

If the average diameter of the region (Rq) having the orientation within 10° from the crystal orientation in which the random specific intensity is maximized is more than 10.0 μm, strain during the hole expansion test easily concentrates in the region and the hole expandability deteriorates.

Also, even when a structure in which the planar density of a such region is less than 1000 pieces/mm² and the crystal orientation is not randomized is provided, similarly, strain during the hole expansion test easily concentrates and the hole expandability deteriorates.

Preferably, the average region diameter of the region (Rq) having the orientation within 10° from the crystal orientation in which the random specific intensity (Iq) is maximized is 8.0 μm or less and a planar density of such a region is 1200 pieces/mm² or more, and more preferably, the average region diameter of the region (Rq) having the orientation within 10° from the crystal orientation in which the random specific intensity (Iq) is maximized is 6.0 μm or less and a planar density of such a region is 1500, pieces/mm² or more.

In the texture at the position of ¼ of the sheet thickness from the surface of the steel sheet according to the embodiment, a maximum value of a random specific intensity and an average diameter and a planar density of the region having the orientation within 10° from the crystal orientation in which the random specific intensity is maximized are measured as follows. That is to say, a range of 100 μm in a thickness direction and 1000 μm in a longitudinal direction centering on the position of ¼ of the sheet thickness from the surface of the vertical cross section parallel to a the rolling direction is measured using an electron back scattering diffraction (EBSD), ODF calculation is performed using TSL OM analysis which is software attached to the EBSD, a maximum intensity in a Φ2=45° cross section in an ODF space is evaluated, and a maximum of a random specific intensity, and an average diameter and a planar density of the region having the orientation within 10° from the crystal orientation in which the random specific intensity is maximized are obtained from the maximum intensity.

2.2 Texture of Surface Layer Portion

It is preferable that the steel sheet according to the embodiment have the above-described texture at the position of ¼ of the sheet thickness from the surface and have a texture, within a range from a surface to 100 μm (surface layer portion), having a maximum of a random specific intensity (Is) measured using a method which will be described later of 4.0 or less, an average diameter (average region diameter) of a region (Rs) having an orientation within 10° from a crystal orientation in which the random specific intensity (Is) is maximized of 10.0 μm or less, and a planar density of the region (region having the orientation within 10° from the crystal orientation in which the random specific intensity is maximized: Rs) of 1000 pieces/mm² or more.

<Maximum Random Specific Intensity: 4.0 or Less>

As a result of diligent studies by the inventors of the present invention, it was found that the bendability and the hydrogen embrittlement resistance characteristics were improved by randomizing the texture in the surface layer portion which is the range from the surface to 100 μm. Although the mechanism by which the bendability and the hydrogen embrittlement resistance characteristics are improved is not clear, it is presumed that, when the texture is strong or when a region in which the crystal orientation in the same orientation is coarse is present in the steel sheet, strain easily concentrates during working such a bending test and fracture easily occurs in a bending test. Furthermore, since deformation of the surface of the steel sheet is most biased during bending deformation due to pre-strain in the evaluation of the hydrogen embrittlement resistance characteristics, it is conceivable that hydrogen embrittlement is suppressed due to the fact that the surface of the steel sheet is soft and the fact that numbers of crack starting points are reduced by reducing an amount of hard phase of the surface layer portion which is a starting point of cracks and making the surface layer portion finely uniform.

That is to say, it is important that a surface layer texture is random. In addition, in the steel sheet according to the embodiment, preferably, the maximum of the random specific intensity (Is) of the texture is 4.0 or less in the surface layer portion. More preferably, the maximum of the random specific intensity (Is) is 3.5 or less.

<Average Diameter of Region Having Orientation within 10° from Crystal Orientation in which Random Specific Intensity is Maximized is 10.0 μm or Less and Planar Density of the Region is 1000 Pieces/Mm² or More>

Preferably, in the steel sheet according to the embodiment, not only the maximum value of the random specific intensity (Is), but also preferably, the average diameter (average region diameter) of the region (Rs) having the orientation within 10° from the crystal orientation in which the random specific intensity (Is) is maximized is 10.0 μm or less and the planar density of such a region is 1000 pieces/mm² or more.

If the average diameter of the region (Rs) having the orientation within 10° from the crystal orientation in which the random specific intensity is maximized is more than 10.0 μm, strain during the bending test easily concentrates in the region and the bendability and the hydrogen embrittlement resistance characteristics are not sufficiently improved, Also, even when a structure in which the crystal orientation is not randomized such as the planar density of such a region is less than 1000 pieces/mm² is provided, similarly, strain during the bending test easily concentrates and the bendability and the hydrogen embrittlement resistance characteristics are not sufficiently improved.

More preferably, the average region diameter of the region (Rs) having the orientation within 10° from the crystal orientation in which the random specific intensity (Is) is maximized is 8.0 μm or less and the planar density of such a region is 1200 pieces/mm² or more. Even more, preferably, the average region diameter of the region (Rs) within 10° from the crystal orientation in which the random specific intensity (Is) is maximized is 6.0 μm or less and the planar density f such a region is 1500 pieces/mm² or more.

The texture of the steel sheet according to the embodiment from the surface to 100 μm is measured as follows. That is to say, a range of 100 μm from the surface and 1000 μm in the longitudinal direction of the vertical cross section parallel to the rolling direction is measured using an electron back scattering diffraction (EBSD) ODF calculation is performed using TSL OIM analysis which is software attached to the EBSD, a maximum intensity in a Φ2=45° cross section in an ODF space is evaluated, and a maximum of the random specific intensity, and an average diameter and a planar density of the region having the orientation within 10° from the crystal orientation in which the random specific intensity is maximized are obtained from the maximum intensity.

3. Chemical Composition of Steel Sheet

A chemical composition of the steel sheet according to the embodiment will be described below. Hereinafter, "%" indicating the content of each element in the chemical composition means "% by mass" in all cases unless otherwise specifically stated.

C: more than 0.140% and less than 0.400%

If the C content is 0.140% or less, it becomes difficult to obtain the metallographic structure described above and a desired tensile strength cannot be achieved. Furthermore, the hole expandability (λ) and the bendability are reduced. Therefore, the C content is more than 0.140%. The C content is preferably more than 0.160%, and more preferably more than 0.180%.

On the other hand, if the C content is 0.400% or more, the weldability deteriorates and the hole expandability (λ) and the bendability deteriorate. Furthermore, the hydrogen embrittlement resistance characteristics also deteriorate. Therefore, the C content is less than 0.400%. The C content is preferably less than 0.350%, and more preferably less than 0.300%.

Si: more than 0.35% and less than 1.50%

Si is an element which is useful for increasing a strength of the steel sheet through solid solution strengthening. Furthermore, since Si suppresses the generation of cementite, Si is an effective element for promoting the concentrating of C in austenite and generating residual austenite after annealing. If the Si content is 0.35% or less, it becomes difficult to obtain the effect of the above action, it becomes difficult to achieve a target of a uniform elongation, and the hydrogen embrittlement resistance characteristics deteriorate, Therefore, the Si content is more than 0.35%. The Si content is preferably more than. 0.40%, and more preferably more than 0.45%.

On the other hand, if the Si content is 1.50% or more, the austenite transformation at the time of heating in an annealing step may be delayed and a sufficient transformation from ferrite to austenite may not occur in some cases. In this case, after annealing, an excessive amount of ferrite remains in the structure after annealing, a target tensile strength cannot be achieved, and the hole expandability (λ) and the bendability deteriorate. Furthermore, if the Si content is 1.50% or more, surface quality of the steel sheet deteriorates. In addition, the chemical conversion processability and the plating property deteriorate significantly. Therefore, the Si content is less than 1.50%. The Si content is preferably less than 1.25%, more preferably less than 1.00%, and even more preferably 0.90% or less or 0.85% or less. Particularly, when the Si content is less than 1.00%, the plating adhesion is improved.

Mn: more than 1.30% and less than 3.50%

Mn is an effective element which has an action of improving the hardenability of steel and obtains the metallographic structure described above. If the Mn content is 1.30% or less, it becomes difficult to obtain the metallographic structure described above. In this case, a sufficient tensile strength cannot be obtained. Therefore, the Mn content is more than 1.30%. The Mn content is preferably more than 1.50%, and more preferably more than 2.00%.

On the other hand, if the Mn content is 3.50% or more, not only the effect of improving the hardenability diminishes due to segregation of Mn, but also the material cost increases. Therefore, the Mn content is less than 3.50%. The Mn content is preferably less than 3.25%, and more preferably less than 3.00%.

P: 0.100% or less

P is an element which is contained in steel as an impurity and is an element which segregates at grain boundaries to embrittle the steel. For this reason, the smaller the P content is, the more preferable it is, and it may be 0%. Here, the P content is 0.100% or less in consideration of a removal time and the cost of P as well. The P content is preferably 0.020% or less, and more preferably 0.015% or less.

S: 0.010% or less

S is an element which is contained in steel as an impurity and is an element which forms sulfide-based inclusions and deteriorates the bendability. For this reason, the smaller the S content is, the more preferable it is. Here, although the S content may be 0%, the S content is 0.010% or less in consideration of a removal time and the cost of S as well. The S content is preferably 0.005% or less, more preferably 0.003% or less, and even more preferably 0.001% or less.

Al: 0.100% or less

Al is an element which has an action of deoxidizing molten steel. When Al is contained for the purpose of deoxidation, the Al content is preferably 0.005% or more, and more preferably 0.010% or more to reliably deoxidize. Al may be contained because Al is an effective element which has an action of enhancing the stability of austenite like Si and obtains the metallographic structure described above.

On the other hand, if the Al content is too high, not only surface defects due to alumina easily occur, but also a transformation point significantly increases and a volume percentage of ferrite increases. In this case, it becomes difficult to obtain the metallographic structure described above and a sufficient tensile strength cannot be obtained. Therefore, the Al content is 0.100% or less. The Al content is preferably 0.050% or less, more preferably 0.040% or less, and even more preferably 0.030% or less. Since the steel sheet according to the embodiment contains Si having a deoxidization action like Al, it is not necessary to contain Al and the Al content may be 0%.

N: 0.0100% or less

N is an element contained in steel as an impurity and is an element which generates coarse precipitates and deteriorates the hole expandability and the bendability. Therefore, the N content is 0.0100% or less. The N content is preferably 0.0060% or less, and more preferably 0.0050% or less. The smaller the N content, the more preferably it is, and it may be 0%.

Although the steel sheet according to the embodiment includes the elements described above and the balance may be Fe and impurities, one or more of elements which will be listed later which affect the strength, the hole expandability, and the bendability may be further contained as optional elements. However, since these elements do not necessarily need to be contained, a lower limit thereof is 0%.

Ti: 0% or more and less than 0.050%
Nb: 0% or more and less than 0.050%
V: 0% or more and 0.50% or less
Cu: 0% or more and 1.00% or less Ti, Nb, V, and Cu are elements which have an action of improving the strength of the steel sheet through precipitation hardening. Therefore, these elements may be contained. In order to obtain the sufficient effects described above, each of the Ti and Nb contents is preferably 0.001% or more and each of the V and Cu contents is preferably 0.01% or more. Each of the Ti and Nb contents is more preferably 0.005% or more and each of the V and Cu contents is more preferably 0.05% or more. It is not essentials to obtain the effects described above. For this reason, it is not necessary to particularly limit lower limits of the contents of Ti, Nb, V, and Cu and the lower limits thereof are 0%.

On the other hand, if excessive amounts of these elements are contained, a recrystallization temperature rises, a metallographic structure of the cold-rolled steel sheet becomes non-uniform, and the hole expandability and the bendability are impaired. Therefore, when each of these elements is contained, the Ti content is less than 0.050%, the Nb content is less than 0.050%, the V content is 0.50% or less, and the Cu content is 1.00% or less. The Ti content is preferably less than 0.030%, and more preferably less than 0.020%. The Nb content is preferably less than 0.030%, and more preferably less than 0.020%®. The V content is preferably 0.30% or less. The Cu content is preferably 0.50% or less.

Ni: 0% or more and 1.00% or less
Cr: 0% or more and 1.00% or less
Mo: 0% or more and 0.50% or less
B: 0% or more and 0.0100% or less Ni, Cr, Mo, and B are elements which improve the hardenability and contribute to increasing the strength of the steel sheet and are effective elements for obtaining the metallographic structure described above. Therefore, these elements may be contained. In order to obtain the sufficient effects described above, it is preferable that each of the contents of Ni, Cr, and Mo be 0.01% or more and/or the B content be 0.0001% or more. It is more preferable that each of the contents of Ni, Cr, and Mo be 0.05% or more and the B content be 0.0010% or more. It is not essential to obtain the effects described above. For this reason, it is not necessary to particularly limit lower limits of the contents of Ni, Cr, Mo, and B and the lower limits thereof are 0%.

On the other hand, even if excessive amounts of these elements are contained, the effects of the actions described above are saturated and it becomes uneconomical. Therefore, when each of these elements is contained, the Ni content and the Cr content are 1.00% or less, the Mo content is 0.50% or less, and the B content is 0.0100% or less. The Ni content and the Cr content are preferably 0.50% or less, the Mo content is preferably 0.20% or less, and the B content is preferably 0.0030% or less.

Ca: 0% or more and 0.0100% or less
Mg: 0% or more and 0.0100% or less
REM: 0% or more and 0.0500% or less
Bi: 0% or more and 0.050% or less Ca, Mg, and REM are elements having an action of improving the strength and the bendability by adjusting the shapes of inclusions. Bi is an element having an action of improving the strength and the bendability by making a solidified structure fine. Therefore, these elements may be contained. In order to obtain the sufficient effects described above, it is preferable that each of the contents of Ca and Mg be 0.0001% or more and each of the contents of REM and Bi be 0.005% or more. It is more preferable that each of the contents of Ca and Mg be 0.0008% or more and each of the contents of REM and Bi be 0.007% or more. It is not essential to obtain the effects described above. For this reason, it is not necessary to particularly limit lower limits of the contents of Ca, Mg, Bi, and REM and the lower limits thereof are 0%.

On the other hand, even if excessive amounts of these elements are contained, the effects of the actions described above are saturated and becomes uneconomical. Therefore, when these elements are contained, the Ca content is 0.0100% or less, the Mg content is 0.0100% or less, the REM content is 0.0500% or less, and the Bi content is 0.050% or less. Preferably, the Ca content is 0.0020% or less, the Mg content is 0.0020% or less, the REM content is 0.0020% or less, and the Bi content is 0.010% or less, REM means a rare earth element and is a general term for 17 elements in total of Sc Y, and lanthanoids, and the REM content is the total content of these elements.

4. Mechanical Properties

[Tensile Strength is 1310 MPa or More and Uniform Elongation is 5.0% or More]

[TS×λ is 35000 MPa·% or More]

[Ratio (R/t) of Limit Bending R and Sheet Thickness t at 90° V Bending is 5.0 or Less]

In the steel sheet according to the embodiment, the tensile strength (TS) is 1310 MPa or more as the strength which contributes to the weight reduction of the vehicle body of the vehicle. From the viewpoint of shock absorption, the strength of the steel sheet is preferably 1350 MPa or more, more preferably 1400 MPa or more, and even more preferably 1470 MPa or more.

Also, from the viewpoint of formability, a uniform elongation (uE1) is 5.0% or more. In order to improve the formability, the uniform elongation (uE1) is more preferably 5.5% or more. Furthermore, from the viewpoint of formability, TS×λ which is a product of the tensile strength and the hole expandability is 35000 MPa·% or more. In order to improve the formability, TS×λ is preferably 45000 MPa·% or more, and more preferably 50000 MPa·% or more.

Although TS×λ≥35000 MPa·% is relatively easily satisfied when the tensile strength of TS×λ is low (for example, less than 1310 MPa), the higher the tensile strength, the more difficult it becomes to be satisfied. Particularly, if the tensile strength is 1400 MPa or more or 1470 MPa or more, TS×λ≥35000 MPa·% is not easily satisfied.

Also, from the viewpoint of bendability, a ratio (R/t) of a limit bending R and a sheet thickness t at 90° V bending is preferably 5.0 or less. In order to improve the bendability, (R/t) is more preferably 4.0 or less, and even more preferably 3.0 or less.

The tensile strength (TS) and the uniform elongation (uE1) are obtained by sampling a JIS No. 5 tensile test piece from a steel sheet in a direction perpendicular to the rolling direction and performing a tensile test in accordance with JIS Z 2241:2011.

Also, the hole expandability (λ) is evaluated in accordance with the hole expansion test method described in JIS Z 2256:2010.

Furthermore, a limit bending radius (R/t) is obtained by changing a radius R at a pitch of 0.5 mm using a 90° V bending die, obtaining a minimum bending R in which cracks do not occur, and dividing the minimum bending R by a sheet thickness t.

The steel sheet according to the embodiment may include a hot-dip galvanized layer on a surface. Corrosion resistance is improved by providing a plating layer on the surface. If there is a concern concerning perforation due to corrosion, the steel sheet for the vehicle may not be thinned to a certain sheet thickness or less even if the strength increases in some cases. One of the purposes of increasing the strength of the steel sheet is to reduce the weight by making the steel sheet thinner. Thus, even if high-strength steel sheets are developed, the'applicable sites are limited if corrosion resistance is low. As a method for solving these problems, it is conceivable to perform plating such as hot dip galvanizing which has high corrosion resistance on a steel sheet. The steel sheet according to the embodiment can be subjected to hot dip galvanizing because the steel sheet components are controlled as described above.

The hot-clip galvanized layer may be a hot-dip galvannealed layer.

5. Production Conditions

As a result of studies by the inventors of the present invention, it was found that, when the structure after hot-rolling is made to have coarse crystal grains by controlling the hot rolling conditions, a grain boundary area in which recrystallization nuclei are generated can be reduced, and the development of the texture can be suppressed by dispersing the carbides finely and uniformly so that reverse transformation nuclei are dispersed to promote reverse transformation, suppressing recrystallization at the time of annealing and heating to promote reverse transformation, and performing annealing in an austenite single phase region and a nearly random texture can be achieved. A detailed description thereof will be provided below.

To be specific, the steel sheet according to the embodiment can be produced using a production method including the following steps (I) to (VII):

(I) a hot rolling step of directly or once cooling a cast slab having a prescribed chemical composition and then heating the cast slab to 1100° C. or higher and subjecting the cast slab to hot rolling so that a rolling temperature in a final stand is 920° C. or higher and a rolling reduction ratio is 15% or less to obtain a hot-rolled steel sheet;

(II) a cooling step of cooling the hot-rolled steel sheet so that the hot-rolled steel sheet passes through a temperature range from 750° C. to 650° C. within 10 seconds;

(III) a coiling step of coiling the hot-rolled steel sheet at 650° C. or lower;

(IV) a cold rolling step of subjecting the hot-rolled steel sheet to pickling and subjecting the hot-rolled steel sheet to cold rolling at a cumulative rolling reduction ratio of 60% or less to obtain a cold-rolled steel sheet;

(V) an annealing step of heating the cold-rolled steel sheet from 550° C. to 750° C. at an average heating rate of 1.0° C./s or higher and 50.0° C./s or lower and performing soaking at 820° C. or higher;

(VI) an cooling after annealing step of cooling, after annealing, the cold-rolled steel sheet to a temperature of 50° C. or higher and 250° C. or lower so that an average cooling rate is 5° C./s or higher in a temperature range from 700° C. to 600° C. and a temperature range from 450° C. to 350° C.; and (VII) a tempering step of performing tempering on the cold-rolled steel sheet which has been subjected to the cooling after annealing step in a temperature range of 200° C. or higher and lower than 350° C. for 1 second or more.

Each of the steps will be described below.

[Hot Rolling Step]

In the hot rolling step, a cast slab having the chemical composition described above is heated and is subjected to hot rolling to obtain a hot-rolled steel sheet. When a temperature of the cast slab is high, the cast slab may be subjected to hot rolling as itis without being subjected to cooling at once to around room temperature. Although the slab heating conditions in the hot rolling are not limited, it is preferable to heat the cast slab to 1100° C. or higher. If a heating temperature is lower than 1100° C., an insufficient homogenization of the material is easily provided.

In order to control the texture at a position of ¼ of the sheet thickness from the surface, a rolling temperature (FT) in a final stand (final pass) of finishing at the time of hot rolling is 920° C. or higher and a rolling reduction ratio in the final stand is 15% or less. If the rolling temperature in the final stand is low or the rolling reduction ratio in the final stand is high, a hot-rolled sheet structure which has been subjected to rolling in the final stand becomes fine. If the hot-rolled sheet structure having a fine structure is subjected to cold rolling and annealing, recrystallization at the time of heating proceeds. Thus, the texture is not random and the hole expandability deteriorates. Therefore, the rolling temperature in the final stand is 920° C. or higher. The rolling temperature in the final stand is preferably 930° C. or higher. Furthermore, the rolling reduction ratio in the final stand is 15% or less. The rolling reduction ratio in the final stand is preferably 13% or less. In principle, although a lower limit value is zero to randomize the texture, when the productionability is taken into consideration, the rolling reduction ratio in the final stand is preferably 5% or more, more preferably 8% or more, and even more preferably 10% or more.

On the other hand, when the texture of the surface layer portion is controlled, it is preferable that the rolling temperature (FT) in the finishing final stand at the time of hot rolling be 960° C. or lower, the rolling reduction ratio in the final stand be 10% or more, and a friction coefficient $\mu$ at the time of rolling in the final stand be 0.15 or more. If the rolling temperature in the finishing final stand at the time of hot rolling is high, the effect of shear deformation decreases, the surface layer texture cannot be controlled, and the bendability and the hydrogen embrittlement resistance characteristics are not sufficiently improved. Thus, the rolling temperature in the final stand is preferably 960° C. or lower. The rolling temperature in the final stand is more preferably 940° C. or lower. Furthermore, if the rolling reduction ratio in the final stand is low and the friction coefficient at the time of rolling in the final stand is low, the surface layer portion is not subjected to shear deformation and the texture of the surface layer portion cannot be formed. Thus, the bendability and the hydrogen embrittlement resistance characteristics are not sufficiently improved. Therefore, it is preferable that the friction coefficient $\mu$ in the finishing final stand at the time of hot rolling be 0.15 or more. More preferably, the friction coefficient $\mu$ is 0.20 or more. Furthermore, the roll reduction ratio in the final stand is preferably 10% or more, and more preferably 12% or more.

That is to say, when the texture of the position of ¼ of the sheet thickness from the surface and the surface layer portion are controlled at the same time as described above, in the hot rolling step, it is preferable that the rolling temperature (FT) in the finishing final stand (final pass) at the time of hot rolling be 920° C. or higher and 960° C. or lower, the rolling reduction ratio in the final stand be 10% or more and 15% or less, and the friction coefficient $\mu$ at the time of rolling in the final stand be 0.15 or more.

[Cooling Step]

After the hot rolling, the hot-rolled steel sheet is cooled to a coiling temperature so that a time at which the hot-rolled steel sheet passes in a temperate range from 750° C. to 650° C. (a time at which the hot-rolled steel sheet stays in the temperature range) is 10 seconds or shorter. If a cooling rate in this temperature range is slow, coarse ferrite is generated so that the structure in which carbides are finely and uniformly dispersed is not formed. In this case, the texture after cold rolling and annealing is not sufficiently random and the hole expandability deteriorates.

[Coiling Step]

After the cooling is performed to the coiling temperature as described above, coiling is performed. The coiling temperature is 650° C. or lower. If the coiling temperature exceeds 650° C., the structure of the hot-rolled steel sheet has a coarse ferrite/pearlite structure and the structure in which carbides are finely and uniformly dispersed is not provided. In this case, the texture after cold rolling and annealing is not sufficiently random, the hole expandability deteriorates, the metallographic structure of the steel sheet after annealing becomes non-uniform, and the bendability deteriorates. The coiling temperature is preferably 630° C. or lower, more preferably 620° C. or lower, and even more preferably 600° C. or lower.

On, the other hand, if the coiling temperature is lower than 500° C., the strength of the hot-rolled steel sheet increases and a load at the time of cold rolling increases. For this reason, the coiling temperature is preferably 500° C. or higher. When the strength of the hot-rolled steel sheet is high, a softening heat treatment such as BAF may be performed before cold rolling.

[Cold Rolling Step]

In the cold rolling step, the hot-rolled steel sheet which has been subjected to hot rolling is subjected to de-scaling through pickling or the like and then is subjected to cold rolling under the conditions of a rolling reduction ratio (cumulative rolling reduction ratio) of 60% or less to obtain a cold-rolled steel sheet. If the rolling reduction ratio in the cold rolling is high, recrystallization at the time of annealing is promoted, the texture after annealing is not random, and the hole expandability, the bendability, and the hydrogen embrittlement resistance characteristics deteriorate. Thus, the rolling reduction ratio in the cold rolling is 60% or less. The rolling reduction ratio is preferably 55% or less, and more preferably 50% or less.

[Annealing Step]

The cold-rolled steel sheet which has been subjected to the cold rolling step is subjected to a treatment such as degreasing in accordance with a known method as necessary and then is heated at an average heating rate of 1.0° C./s or higher and 50.0° C./s or lower from 550° C. to 750° C. and is subjected to annealing in which soaking is performed at 820° C. or higher.

In the annealing step, a heating rate from 550° C. to 750° C. is 1.0° C./s or higher and 50° C./s or lower. If the heating rate is slow, recrystallization proceeds, the texture after annealing is not sufficiently random, and the hole expandability deteriorates. Thus, the heating rate is 1.0° C./s or higher. The heating rate is preferably 1.5° C./s or higher, and more preferably 2.0° C./s or higher. In order that the texture is sufficiently randomized to the surface layer portion after annealing, the average heating rate up to 750° C. is preferably 3.0° C./s or higher. From the viewpoint of randomizing the texture of the surface layer portion, the average heating rate up to 750° C. is more preferably 5.0° C./s or higher.

On the other hand, if the average heating rate is excessively high, ferrite transformation excessively promoted due to austenite granulation. In this case, in the finally obtained steel sheet, the target structure is not obtained and the strength, the hole expandability, and the bendability deteriorate. Thus, the heating rate is 50.0° C./ or lower. The heating rate is preferably 30.0° C./s or lower, and more preferably 10.0° C./s or lower.

The soaking temperature (annealing temperature) in the annealing step is 820° C. or higher. If the soaking temperature is low, not only the annealing is not austenite single-phase annealing and the texture is not sufficiently random, but also the volume percentage of ferrite increases and the hole expandability and the bendability deteriorate. Thus, the soaking temperature is 820° C. or higher. The soaking temperature is preferably 830° C. or higher or 835° C. or higher. Although a higher soaking temperature makes it easier to secure the hole expandability and the bendability, if the soaking temperature is too high, the production cost increases. Thus, the soaking temperature is preferably 900° C. or lower. The soaking temperature is more preferably 880° C. or lower and even more preferably 870° C. or lower.

A soaking time is not limited, but is preferably 30 to 450 seconds. If the soaking time is shorter than 30 seconds, austenitization may not proceed sufficiently in some cases. For this reason, the soaking time is preferably 30 seconds or longer. On the other hand, if the soaking time exceeds 450 seconds, the productivity decreases. Thus, the soaking time is preferably 450 seconds or shorter.

[Cooling after Annealing Step]

In order to obtain the metallographic structure as described above, the cold-rolled steel sheet which has been subjected to annealing is cooled to a temperature of 50° C. or higher and 250° C. or lower so that an average cooling rate in a ferrite transformation temperature range of 700° C. to 600° C. and an average cooling rate in a bainite transformation temperature range of 450° C. to 350° C. are both 5° C. is or higher. If the cooling rates in the temperature ranges are slow, volume percentages of ferrite and bainite at a position of ¼ of the sheet thickness from the surface increases and a volume percentage of tempered martensite decreases. As a result, the tensile strength decreases and the hole expandability, the bendability, and the hydrogen embrittlement resistance characteristics deteriorate. Thus, the average cooling rates of 700° C. to 600° C. and 450° C. to 350° C. are 5° C./s or higher. The average cooling rate is preferably 10° C./s or higher, and more preferably 20° C./s or higher.

A cooling stop temperature is 50° C. or higher and 250° C. or lower. If the cooling stop temperature is high, martensite (which is not tempered) increases in the cooling after a subsequent tempering step and the hole expandability, the bendability, and the hydrogen embrittlement resistance characteristics deteriorate. Thus, the cooling stop temperature is 250° C. or lower. On the other hand, if the cooling stop temperature is low a residual austenite percentage decreases and a target uniform elongation cannot be obtained. Thus, the cooling stop temperature is 50° C. or higher. The cooling stop temperature is preferably 75° C. or higher, and more preferably 100° C. or higher.

[Hot-Dip Galvanizing Step]
[Alloying Step]

When a cold-rolled steel sheet (hot-dip galvanized steel sheet) having a hot-dip galvanized layer on a surface is produced, in the cooling after annealing step, the cold-rolled steel sheet may be further immersed in a hot dipping bath in a temperature range of higher than 450° C. and lower than 600° C. and hot dip galvanizing may be performed. Furthermore, when the cold-rolled steel sheet (hot-dip galvannealed steel sheet) having a hot-dip galvannealed surface is produced, subsequent to the hot-dip galvanizing step, an alloying treatment may be performed such that the plating is hot-dip galvannealed plating.

[Tempering Step]

The cold-rolled steel sheet which has been subjected to the cooling after annealing step is cooled to a temperature of 50° C. or higher and 250° C. or lower so that untransformed austenite transforms into martensite. After that, the cold-rolled steel sheet is tempered at a temperature of 200° C. or higher and lower than 350° C. for 1 second or longer (tempering step) to obtain a structure mainly including tempered martensite at a position of ¼ of the plate thickness from the surface.

When the hot-dip galvanizing step and/or the alloying step is performed, the cold-rolled steel sheet which has been subjected to the hot-dip galvanizing step or the cold-rolled steel sheet which has been subjected to the hot-dip galvanizing step and the alloying step is cooled to a temperature of 50° C. or higher and 250° C. or lower, and then tempered at a temperature of 200° C. or higher and lower than 350° C. for 1 second or longer. If a tempering temperature is 350° C. or higher, the strength of the steel sheet decreases. Thus, the tempering temperature is lower than 350° C. The tempering temperature is preferably 325° C. or lower, and more preferably 300° C. or lower. When the tensile strength is desired to be further increased, it is preferable to decrease the tempering temperature. For example, when the tensile strength is 1400 MPa or more, the tempering temperature is preferably 275° C. or lower. When the tensile strength is 1470 MPa or more, the tempering temperature is preferably 250° C. or lower.

On the other hand, if the tempering temperature is lower than 200° C., an insufficient tempering is provided and the hole expandability, the bendability, and the hydrogen embrittlement resistance characteristics deteriorate. Thus, the tempering temperature is 200° C. or higher. From the viewpoint of the hole expandability, the bendability, and the hydrogen embrittlement resistance characteristics, the tempering temperature is preferably 220° C. or higher, and more preferably 250° C. or higher.

A tempering time may be 1 second or longer, but is preferably 5 seconds or longer, and more preferably 10 seconds or longer to perform a stable tempering treatment. On the other hand, tempering for a long time may reduce the strength of the steel sheet. For this reason, the tempering time is preferably 750 seconds or shorter, and more preferably 500 seconds or shorter.

[Skin Pass Step]

The cold-rolled steel sheet which has been subjected to the tempering step may be cooled to a temperature at which skin pass rolling is possible and then may be subjected to skin pass rolling. When cooling after annealing is water spray cooling, dip cooling, air-water cooling, or the like using water, in order to remove an oxide film formed due to contact with water at high temperature and improve the chemical conversion processability of the steel sheet, before skin pass rolling, it is preferable to perform pickling and then perform plating of one or more of a small amount of Ni, Fe, Co, Sn, and Cu. Here, the small amount means an amount of plating of about 3 to 30 mg/m² on a surface of the steel sheet.

A shape of the steel sheet can be adjusted through skin pass rolling. An elongation rate of the skin pass rolling is preferably 0.10% or more, and more preferably 0.15) or more. On the other hand, if the elongation rate of the skin pass rolling is high, a volume percentage of residual austenite decreases and the ductility deteriorates. For this reason, the elongation rate is preferably 1.00% or less. The elongation rate is more preferably 0.75% or less, and even more preferably 0.50% or less.

EXAMPLES

The present invention will be described in detail with reference to examples.

A slab having the chemical composition shown in Table 1 was cast. The cast slab was heated to 1100° C. or higher, hot-rolled to 2.8 mm, coiled, and cooled to room temperature. Hot rolling conditions, cooling conditions, and coiling temperatures are as shown in Tables 2-1 to 2-2.

After that, a scale of the hot-rolled steel sheet was removed through pickling, the hot-rolled steel sheet was cold-rolled to 1.4 mm, and then annealed at a soaking temperature shown in Tables 2-1 and 2-2 for 120 seconds. Heating rates at 550° C. to 750° C. at the time of annealing and heating are as shown in Tables 2-1 and 2-2.

After annealing, the annealed cold-rolled steel sheet was cooled to a cooling stop temperature of 50° C. or higher and 250° C. or lower so that an average cooling rate in a temperature range of 700° C. to 600° C. and a temperature range of 450° C. to 350° C. are 20° C./s or higher, and then was subjected to a tempering heat treatment for 1 second to 500 seconds at the tempering temperatures shown in Tables 2-1 and 2-2.

For some of the examples, hot dip galvanizing and alloying were performed during cooling after annealing. In Tables 5-1 and 5-2, "CR" shown is a cold-rolled steel sheet which has not been galvanized, "GI" is a hot-dip galvanized steel sheet, and "GA" is an alloyed, hot-dip galvannealed steel sheet. The hot-dip galvannealed steel sheet was subjected to hot-dip galvanizing at a temperature of higher than 450° C. and lower than 600° C. to form a galvanized layer of about 35 to 65 g/m², and then further alloyed at a temperature o higher than 450° C. and lower than 600° C.

TABLE 1

Chemical composition (% by mass) (balance: Fe and impurities)

| Steel | C | Si | Mn | P | S | Al | N | Others |
|---|---|---|---|---|---|---|---|---|
| A1 | 0.139 | 0.43 | 1.81 | 0.009 | 0.001 | 0.034 | 0.0030 | |
| B1 | 0.225 | 0.32 | 2.43 | 0.010 | 0.001 | 0.033 | 0.0033 | |
| C1 | 0.235 | 0.97 | 1.27 | 0.010 | 0.001 | 0.031 | 0.0033 | |
| D1 | 0.402 | 0.39 | 3.46 | 0.008 | 0.001 | 0.031 | 0.0030 | |
| E1 | 0.226 | 1.54 | 1.86 | 0.010 | 0.001 | 0.032 | 0.0032 | |
| F1 | 0.325 | 0.80 | 3.59 | 0.008 | 0.001 | 0.028 | 0.0029 | |
| G1 | 0.223 | 0.77 | 2.15 | 0.010 | 0.001 | 0.112 | 0.0034 | |
| H1 | 0.234 | 0.71 | 2.66 | 0.010 | 0.001 | 0.031 | 0.0027 | |
| I1 | 0.242 | 0.74 | 2.54 | 0.008 | 0.001 | 0.030 | 0.0029 | |
| J1 | 0.221 | 0.77 | 2.59 | 0.008 | 0.001 | 0.034 | 0.0035 | |
| K1 | 0.165 | 0.76 | 3.21 | 0.008 | 0.001 | 0.030 | 0.0032 | |
| L1 | 0.223 | 0.72 | 2.47 | 0.009 | 0.001 | 0.033 | 0.0031 | Cu:0.01 Ni:0.01 V:0.09 |
| M1 | 0.243 | 0.75 | 2.52 | 0.010 | 0.001 | 0.040 | 0.0029 | Ti:0.021 Nb:0.008 B:0.0019 |
| N1 | 0.349 | 0.72 | 1.77 | 0.008 | 0.001 | 0.026 | 0.0031 | Mo:0.08 Cr:0.26 |
| O1 | 0.237 | 0.74 | 2.58 | 0.008 | 0.001 | 0.028 | 0.0028 | Bi:0.010 REM:0.008 |
| P1 | 0.228 | 0.78 | 2.43 | 0.009 | 0.001 | 0.033 | 0.0036 | Ca:0.007 Mg:0.0009 |
| A2 | 0.138 | 0.42 | 1.83 | 0.010 | 0.001 | 0.031 | 0.0032 | |
| B2 | 0.224 | 0.33 | 2.45 | 0.008 | 0.001 | 0.034 | 0.0034 | |
| C2 | 0.236 | 0.98 | 1.29 | 0.008 | 0.001 | 0.028 | 0.0029 | |
| D2 | 0.405 | 0.41 | 3.45 | 0.010 | 0.001 | 0.030 | 0.0029 | |
| E2 | 0.224 | 1.55 | 1.85 | 0.008 | 0.001 | 0.040 | 0.0030 | |
| F2 | 0.324 | 0.83 | 3.60 | 0.009 | 0.001 | 0.031 | 0.0027 | |
| G2 | 0.221 | 0.78 | 2.14 | 0.008 | 0.001 | 0.115 | 0.0029 | |
| H2 | 0.235 | 0.72 | 2.65 | 0.010 | 0.001 | 0.032 | 0.0033 | |
| I2 | 0.243 | 0.75 | 2.52 | 0.010 | 0.001 | 0.033 | 0.0033 | |
| J2 | 0.220 | 0.75 | 2.56 | 0.008 | 0.001 | 0.033 | 0.0031 | |
| K2 | 0.163 | 0.75 | 3.18 | 0.010 | 0.001 | 0.034 | 0.0035 | |
| L2 | 0.226 | 0.74 | 2.52 | 0.008 | 0.001 | 0.031 | 0.0032 | Ni:0.09 Cu:0.11 V:0.08 |
| M2 | 0.245 | 0.71 | 2.49 | 0.009 | 0.001 | 0.030 | 0.0031 | Ti:0.018 Nb:0.011 B:0.0016 |
| N2 | 0.346 | 0.75 | 1.79 | 0.008 | 0.001 | 0.028 | 0.0030 | Mo:0.07 Cr:0.22 |
| O2 | 0.235 | 0.72 | 2.57 | 0.010 | 0.001 | 0.026 | 0.0027 | Bi:0.009 REM:0.007 |
| P2 | 0.231 | 0.77 | 2.44 | 0.009 | 0.001 | 0.029 | 0.0035 | Ca:0.008 Mg:0.0008 |

TABLE 2-1

| | | Hot rolling step | | | Cooling step | | Annealing step | | Tempering step |
|---|---|---|---|---|---|---|---|---|---|
| Test No. | Steel | Rolling temperature in final stand (° C.) | Rolling reduction ratio in final stand (%) | Friction coefficient μ at time of rolling in final stand | Staying time from 750° C. to 650° C. during cooling after rolling (s) | Coiling step Coiling temperature (° C.) | Soaking temperature (° C.) | Heating rate from 550° C. to 750° C. (° C./s) | Tempering temperature (° C.) |
| 1 | A1 | 930 | 12 | 0.20 | 8 | 630 | 820 | 2.1 | 265 |
| 2 | B1 | 940 | 11 | 0.25 | 7 | 620 | 830 | 2.1 | 235 |
| 3 | C1 | 930 | 12 | 0.25 | 8 | 630 | 825 | 2.1 | 260 |
| 4 | D1 | 945 | 13 | 0.25 | 4 | 560 | 825 | 2.1 | 200 |
| 5 | E1 | 930 | 12 | 0.25 | 7 | 620 | 835 | 2.1 | 280 |
| 6 | F1 | 930 | 11 | 0.25 | 5 | 580 | 830 | 2.1 | 245 |
| 7 | G1 | 930 | 12 | 0.25 | 7 | 620 | 825 | 2.1 | 220 |
| 8 | H1 | 945 | 12 | 0.25 | 7 | 630 | 835 | 2.1 | 235 |
| 9 | H1 | 930 | 12 | 0.25 | 8 | 645 | 800 | 2.1 | 230 |
| 10 | H1 | 910 | 14 | 0.25 | 8 | 645 | 845 | 2.1 | 260 |
| 11 | H1 | 925 | 16 | 0.25 | 9 | 630 | 845 | 2.1 | 265 |
| 12 | H1 | 930 | 13 | 0.25 | 11 | 640 | 855 | 2.1 | 260 |
| 13 | H1 | 930 | 12 | 0.25 | 8 | 665 | 850 | 2.1 | 260 |
| 14 | H1 | 925 | 14 | 0.25 | 9 | 645 | 815 | 2.1 | 280 |
| 15 | H1 | 930 | 13 | 0.25 | 9 | 630 | 825 | 0.5 | 280 |
| 16 | H1 | 925 | 13 | 0.25 | 4 | 550 | 825 | 60.0 | 290 |
| 17 | H1 | 945 | 12 | 0.25 | 5 | 550 | 855 | 2.1 | 240 |

TABLE 2-1-continued

| | | Hot rolling step | | | Cooling step | | Annealing step | | Tempering |
|---|---|---|---|---|---|---|---|---|---|
| Test No. | Steel | Rolling temperature in final stand (° C.) | Rolling reduction ratio in final stand (%) | Friction coefficient μ at time of rolling in final stand | Staying time from 750° C. to 650° C. during cooling after rolling (s) | Coiling step Coiling temperature (° C.) | Soaking temperature (° C.) | Heating rate from 550° C. to 750° C. (° C./s) | step Tempering temperature (° C.) |
| 18 | H1 | 930 | 12 | 0.25 | 4 | 550 | 820 | 2.1 | 260 |
| 19 | H1 | 930 | 11 | 0.25 | 7 | 630 | 835 | 2.1 | 240 |
| 20 | H1 | 925 | 14 | 0.25 | 8 | 645 | 825 | 2.1 | 305 |
| 21 | H1 | 945 | 12 | 0.25 | 4 | 550 | 860 | 2.1 | 225 |
| 22 | H1 | 930 | 12 | 0.25 | 8 | 630 | 830 | 2.1 | 255 |
| 23 | H1 | 930 | 13 | 0.25 | 4 | 550 | 845 | 2.1 | 265 |
| 24 | H1 | 930 | 12 | 0.25 | 5 | 550 | 855 | 2.1 | 255 |
| 25 | H1 | 940 | 12 | 0.25 | 4 | 550 | 825 | 2.1 | 265 |
| 26 | I1 | 945 | 11 | 0.25 | 7 | 630 | 845 | 2.1 | 245 |
| 27 | J1 | 930 | 12 | 0.25 | 4 | 550 | 850 | 2.1 | 225 |
| 28 | K1 | 930 | 12 | 0.25 | 8 | 630 | 850 | 2.1 | 315 |
| 29 | L1 | 930 | 12 | 0.25 | 4 | 550 | 845 | 2.1 | 245 |
| 30 | M1 | 945 | 11 | 0.25 | 7 | 630 | 850 | 2.1 | 245 |
| 31 | M1 | 930 | 12 | 0.25 | 5 | 550 | 845 | 2.1 | 240 |
| 32 | M1 | 930 | 13 | 0.25 | 4 | 550 | 860 | 2.1 | 210 |
| 33 | O1 | 940 | 12 | 0.25 | 7 | 630 | 835 | 2.1 | 245 |
| 34 | O1 | 930 | 11 | 0.25 | 8 | 630 | 845 | 2.1 | 235 |
| 35 | P1 | 940 | 12 | 0.25 | 7 | 620 | 850 | 2.1 | 230 |
| 36 | P1 | 940 | 12 | 0.25 | 4 | 550 | 850 | 2.1 | 235 |

TABLE 2-2

| | | Hot rolling step | | | Cooling step | | Annealing step | | Tempering |
|---|---|---|---|---|---|---|---|---|---|
| Test No. | Steel | Rolling temperature in final stand (° C.) | Rolling reduction ratio in final stand (%) | Friction coefficient μ at time of rolling in final stand | Staying time from 750° C. to 650° C. during cooling after rolling (s) | Coiling step Coiling temperature (° C.) | Soaking temperature (° C.) | Heating rate from 550° C. to 750° C. (° C./s) | step Tempering temperature (° C.) |
| 37 | A2 | 925 | 11 | 0.25 | 5 | 635 | 825 | 5.0 | 270 |
| 38 | B2 | 935 | 12 | 0.25 | 4 | 625 | 835 | 5.0 | 230 |
| 39 | C2 | 935 | 11 | 0.25 | 4 | 635 | 820 | 5.0 | 260 |
| 40 | D2 | 945 | 12 | 0.25 | 5 | 570 | 820 | 5.0 | 200 |
| 41 | E2 | 935 | 13 | 0.25 | 4 | 625 | 840 | 5.0 | 275 |
| 42 | F2 | 925 | 11 | 0.25 | 6 | 575 | 835 | 5.0 | 240 |
| 43 | G2 | 925 | 12 | 0.25 | 5 | 625 | 830 | 5.0 | 225 |
| 44 | H2 | 950 | 13 | 0.25 | 4 | 620 | 840 | 5.0 | 235 |
| 45 | H2 | 935 | 11 | 0.25 | 4 | 640 | 805 | 5.0 | 230 |
| 46 | H2 | 965 | 13 | 0.25 | 5 | 630 | 845 | 5.0 | 260 |
| 47 | H2 | 945 | 8 | 0.25 | 5 | 625 | 845 | 5.0 | 265 |
| 48 | H2 | 925 | 12 | 0.10 | 4 | 635 | 850 | 5.0 | 260 |
| 49 | H2 | 925 | 13 | 0.25 | 4 | 660 | 855 | 5.0 | 265 |
| 50 | H2 | 935 | 12 | 0.25 | 6 | 640 | 815 | 5.0 | 280 |
| 51 | H2 | 940 | 14 | 0.20 | 5 | 580 | 850 | 5.0 | 225 |
| 52 | H2 | 940 | 13 | 0.25 | 4 | 540 | 850 | 5.0 | 230 |
| 53 | H2 | 925 | 13 | 0.25 | 4 | 560 | 825 | 5.0 | 255 |
| 54 | H2 | 925 | 12 | 0.25 | 5 | 620 | 830 | 5.0 | 240 |
| 55 | H2 | 930 | 13 | 0.25 | 4 | 640 | 830 | 5.0 | 325 |
| 56 | H2 | 940 | 13 | 0.25 | 5 | 560 | 850 | 5.0 | 235 |
| 57 | H2 | 935 | 13 | 0.25 | 4 | 645 | 835 | 5.0 | 260 |
| 58 | H2 | 925 | 12 | 0.25 | 5 | 540 | 850 | 5.0 | 270 |
| 59 | H2 | 935 | 13 | 0.25 | 5 | 560 | 850 | 5.0 | 260 |
| 60 | H2 | 940 | 13 | 0.25 | 4 | 540 | 830 | 5.0 | 265 |
| 61 | I2 | 940 | 12 | 0.25 | 5 | 620 | 840 | 5.0 | 240 |
| 62 | J2 | 935 | 13 | 0.25 | 5 | 560 | 845 | 5.0 | 230 |
| 63 | K2 | 925 | 13 | 0.25 | 4 | 600 | 855 | 5.0 | 325 |
| 64 | L2 | 925 | 12 | 0.25 | 5 | 560 | 850 | 5.0 | 240 |
| 65 | M2 | 940 | 13 | 0.25 | 4 | 615 | 855 | 5.0 | 235 |
| 66 | M2 | 925 | 13 | 0.25 | 5 | 540 | 850 | 5.0 | 230 |
| 67 | N2 | 925 | 12 | 0.20 | 4 | 560 | 855 | 5.0 | 205 |
| 68 | O2 | 935 | 13 | 0.25 | 5 | 605 | 835 | 5.0 | 240 |
| 69 | O2 | 935 | 12 | 0.25 | 4 | 600 | 840 | 5.0 | 235 |
| 70 | P2 | 935 | 13 | 0.25 | 4 | 605 | 855 | 5.0 | 240 |
| 71 | P2 | 930 | 13 | 0.25 | 5 | 560 | 855 | 5.0 | 245 |

TABLE 2-2-continued

| | | Hot rolling step | | | Cooling step | | Annealing step | | Tempering |
|---|---|---|---|---|---|---|---|---|---|
| Test No. | Steel | Rolling temperature in final stand (° C.) | Rolling reduction ratio in final stand (%) | Friction coefficient μ at time of rolling in final stand | Staying time from 750° C. to 650° C. during cooling after rolling (s) | Coiling step Coiling temperature (° C.) | Soaking temperature (° C.) | Heating rate from 550° C. to 750° C. (° C./s) | Tempering step Tempering temperature (° C.) |
| 72 | P2 | 920 | 13 | 0.25 | 6 | 600 | 845 | 5.0 | 240 |
| 73 | P2 | 925 | 13 | 0.25 | 4 | 600 | 845 | 5.0 | <u>355</u> |

From the obtained annealed steel sheet, a test piece for SEM observation was sampled as described above, the vertical cross section parallel to the rolling direction was polished, and then the metallographic structure was observed at a position (t/4) of ¼ of the sheet thickness and the volume percentage of each structure was measured through image processing. Furthermore, a test piece for X-ray diffraction was sampled and the volume percentage of the residual austenite was measured using X-ray diffraction on a surface which is chemically polished to a thickness of ¼ from the surface layer as described above.

Also, in the way described above, through an EBSD measurement, the position of ¼ of the sheet thickness from the surface and the texture of the surface layer portion (maximum value of random specific intensity and average diameter and planar density of region having orientation within 10° from crystal orientation in which random specific intensity is maximized) were measured.

The results are shown in Tables 3-1 and 3-2 and Tables 4-1 and 4-2.

Also, the tensile strength (TS), the uniform elongation (uE1), the hole expansion ratio (λ), the limit bending radius (R/t), and the hydrogen embrittlement resistance characteristics were evaluated in the way which will be described later.

The tensile strength (TS) and the uniform elongation (uE1) were obtained by sampling the tensile test piece from the annealed steel sheet according to JIS No. 5 in a direction perpendicular to the rolling direction and performing a tensile test in accordance with JIS Z 2241:2011.

The results are shown in Tables 5-1 and 5-2.

The hole expansion ratio (λ) was evaluated through the method described in JIS Z 2256:2010.

The results are shown Tables 5-1 and 5-2.

The limit bending radius (RA) which is an index of the bendability was obtained by changing a radius R at a pitch of 0.5 mm using a 90° V bending die, obtaining a minimum bending R in which cracks do not occur, and dividing the minimum bending R by a sheet thickness (1.4 mm).

The results are shown in Tables 5-1 and 5-2.

The following tests were performed to evaluate the hydrogen embrittlement resistance characteristics.

That is to say, a test piece whose end surface was mechanically ground was bent into a U shape through a push-bending method to prepare a U-bending test piece having a radius of 5R, tightened with bolts so that non-bent portions are parallel, and elastically deformed, and then immersed in hydrochloric acid with a pH of 1 and subjected to a delayed fracture acceleration test in which hydrogen was allowed to enter the steel sheet. A steel sheet in which cracks did not occur even when an immersion time was 100 hours was evaluated as a steel sheet with good (OK) delayed fracture resistance characteristics and a steel sheet in which cracks occurred when an immersion time was 100 hours was evaluated as a steel sheet with defective (NG) delayed fracture resistance characteristics. In order to eliminate the influence of plating, a plating material was evaluated for the hydrogen embrittlement resistance characteristics after removing a plating layer with hydrochloric acid containing an inhibitor before the test.

The results are shown in Tables 5-1 and 5-2.

TABLE 3-1

| | ¼ t portion | | | | | | | | |
|---|---|---|---|---|---|---|---|---|---|
| | Metal structure (% corresponds to % by volume) | | | | | | | Texture | |
| | | | | | | | | Average diameter of region which has orientation within | Surface density of region which has orientation within |
| Test No. | Ferrite (%) | Bainite (%) | Total of ferrite and bainite (%) | Residual austenite (%) | Martensite (%) | Tempered martensite (%) | Remainder (%) | Maximum random specific intensity | 10° from orientation in which random specific intensity is maximized (μm) | 10° from orientation in which random specific intensity is maximized (pieces/mm²) |
| 1 | 10.7 | 6.2 | <u>16.9</u> | 3.4 | 0.0 | <u>79.7</u> | 0.0 | 3.8 | <u>10.2</u> | 980 |
| 2 | 0.0 | 6.4 | <u>6.4</u> | 2.4 | 0.0 | <u>91.2</u> | 0.0 | 3.8 | <u>5.6</u> | 1560 |
| 3 | 5.2 | 19.3 | <u>24.5</u> | <u>5.6</u> | 0.0 | <u>69.9</u> | 0.0 | 3.9 | <u>10.2</u> | 990 |
| 4 | 0.0 | 0.0 | <u>0.0</u> | 7.6 | 5.3 | <u>87.1</u> | 0.0 | 3.4 | <u>5.4</u> | 1580 |
| 5 | 25.4 | 26.1 | 51.5 | <u>10.5</u> | <u>8.6</u> | 29.4 | 0.0 | 3.9 | <u>10.1</u> | 980 |
| 6 | 0.0 | 0.0 | 0.0 | <u>6.2</u> | <u>6.4</u> | <u>87.4</u> | 0.0 | 3.6 | <u>5.8</u> | 1520 |
| 7 | 28.3 | 0.0 | <u>28.3</u> | 6.4 | <u>0.0</u> | <u>65.3</u> | 0.0 | 3.8 | <u>10.3</u> | 970 |
| 8 | 0.0 | 9.4 | <u>9.4</u> | 5.2 | 0.0 | <u>85.4</u> | 0.0 | 3.4 | <u>5.4</u> | 1560 |
| 9 | 24.7 | 0.0 | <u>24.7</u> | 5.9 | 1.4 | <u>62.8</u> | 5.2 | 3.8 | <u>10.2</u> | 980 |
| 10 | 0.0 | 3.2 | <u>3.2</u> | 6.1 | 1.7 | <u>89.0</u> | 0.0 | <u>4.1</u> | <u>10.3</u> | <u>990</u> |
| 11 | 0.0 | 0.0 | 0.0 | 6.2 | 1.5 | 92.3 | 0.0 | <u>4.2</u> | <u>10.1</u> | <u>970</u> |
| 12 | 0.0 | 0.4 | 0.4 | 5.3 | 0.0 | 94.3 | 0.0 | <u>4.1</u> | <u>10.3</u> | <u>990</u> |

TABLE 3-1-continued

¼ t portion

| | Metal structure (% corresponds to % by volume) | | | | | | | Texture | | |
|---|---|---|---|---|---|---|---|---|---|---|
| Test No. | Ferrite (%) | Bainite (%) | Total of ferrite and bainite (%) | Residual austenite (%) | Martensite (%) | Tempered martensite (%) | Remainder (%) | Maximum random specific intensity | Average diameter of region which has orientation within 10° from orientation in which random specific intensity is maximized (μm) | Surface density of region which has orientation within 10° from orientation in which random specific intensity is maximized (pieces/mm²) |
| 13 | 0.0 | 1.2 | 1.2 | 5.4 | 0.0 | 93.4 | 0.0 | 4.2 | 10.2 | 970 |
| 14 | 11.3 | 3.4 | 14.7 | 5.9 | 0.0 | 80.1 | 0.0 | <u>3.8</u> | <u>10.2</u> | <u>990</u> |
| 15 | 9.8 | 3.3 | 13.1 | 5.3 | 0.0 | 81.6 | 0.0 | 4.1 | <u>10.1</u> | <u>980</u> |
| 16 | 11.4 | 5.1 | <u>16.5</u> | 5.2 | 0.0 | 78.3 | 0.0 | 3.0 | 5.5 | 1630 |
| 17 | 0.0 | 0.0 | <u>0.0</u> | 5.1 | 0.0 | 94.9 | 0.0 | 2.8 | 5.4 | 1580 |
| 18 | 6.7 | 3.6 | 10.3 | 5.3 | 0.0 | 83.3 | 1.1 | 3.1 | 5.5 | 1600 |
| 19 | 4.8 | 3.4 | 8.2 | 5.6 | 0.0 | 85.4 | 0.8 | 3.4 | 5.4 | 1580 |
| 20 | 10.2 | 3.4 | 13.6 | 5.5 | 0.0 | 80.9 | 0.0 | 3.8 | 7.8 | 1220 |
| 21 | 0.0 | 0.0 | 0.0 | 5.2 | 0.0 | 94.8 | 0.0 | 3.0 | 5.3 | 1580 |
| 22 | 6.4 | 3.8 | 10.2 | 6.2 | 0.0 | 83.6 | 0.0 | 3.7 | 7.6 | 1240 |
| 23 | 5.8 | 3.7 | 9.5 | 5.4 | 0.0 | 85.1 | 0.0 | 3.0 | 5.4 | 1520 |
| 24 | 3.5 | 2.3 | 5.8 | 5.3 | 0.0 | 88.9 | 0.0 | 2.9 | 5.5 | 1560 |
| 25 | 6.1 | 2.8 | 8.9 | 5.1 | 0.0 | 83.9 | 2.1 | 3.0 | 5.6 | 1560 |
| 26 | 3.8 | 2.1 | 5.9 | 5.4 | 0.0 | 88.7 | 0.0 | 3.3 | 5.4 | 1540 |
| 27 | 0.0 | 0.0 | 0.0 | 5.4 | 0.0 | 94.6 | 0.0 | 2.9 | 5.5 | 1560 |
| 28 | 0.0 | 0.0 | 0.0 | 5.7 | 0.0 | 94.3 | 0.0 | 3.4 | 5.7 | 1580 |
| 29 | 3.8 | 2.1 | 5.9 | 5.6 | 0.0 | 88.5 | 0.0 | 3.0 | 5.5 | 1600 |
| 30 | 3.9 | 2.3 | 6.2 | 5.4 | 0.0 | 88.4 | 0.0 | 3.3 | 5.7 | 1620 |
| 31 | 3.2 | 2.1 | 5.3 | 5.5 | 0.0 | 89.2 | 0.0 | 2.8 | 5.3 | 1580 |
| 32 | 2.9 | 1.6 | 4.5 | 7.0 | 2.4 | 85.1 | 1.0 | 2.9 | 5.5 | 1620 |
| 33 | 6.2 | 3.1 | 9.3 | 5.1 | 0.0 | 85.6 | 0.0 | 3.4 | 5.7 | 1560 |
| 34 | 5.4 | 3.4 | 8.8 | 5.4 | 0.0 | 85.8 | 0.0 | 3.3 | 5.3 | 1620 |
| 35 | 5.3 | 3.5 | 8.8 | 5.6 | 0.0 | 85.6 | 0.0 | 3.3 | 5.5 | 1600 |
| 36 | 5.7 | 3.4 | 9.1 | 5.2 | 0.0 | 85.7 | 0.0 | 3.0 | 5.4 | 1560 |

TABLE 3-2

¼ t portion

| | Metal structure (% corresponds to % by volume) | | | | | | | Texture | | |
|---|---|---|---|---|---|---|---|---|---|---|
| Test No. | Ferrite (%) | Bainite (%) | Total of ferrite and bainite (%) | Residual austenite (%) | Martensite (%) | Tempered martensite (%) | Remainder (%) | Maximum random specific intensity | Average diameter of region which has orientation within 10° from orientation in which random specific intensity is maximized (μm) | Surface density of region which has orientation within 10° from orientation in which random specific intensity is maximized (pieces/mm²) |
| 37 | 10.4 | 6.2 | 16.6 | 3.5 | 0.0 | 79.9 | 0.0 | 3.7 | <u>10.2</u> | <u>990</u> |
| 38 | 0.0 | 6.1 | <u>6.1</u> | <u>2.3</u> | 0.0 | 91.6 | 0.0 | 3.7 | <u>5.6</u> | 1580 |
| 39 | 4.8 | 17.6 | <u>22.4</u> | <u>5.4</u> | 0.0 | <u>72.2</u> | 0.0 | 3.8 | <u>10.1</u> | <u>990</u> |
| 40 | 0.0 | 0.0 | <u>0.0</u> | 7.5 | <u>5.4</u> | <u>87.1</u> | 0.0 | 3.4 | <u>5.3</u> | <u>1590</u> |
| 41 | 22.4 | 23.1 | <u>45.5</u> | 10.3 | <u>7.9</u> | <u>36.3</u> | 0.0 | 3.8 | <u>10.1</u> | <u>990</u> |
| 42 | 0.0 | 0.0 | <u>0.0</u> | <u>6.1</u> | <u>6.3</u> | <u>87.6</u> | 0.0 | 3.6 | <u>5.7</u> | <u>1530</u> |
| 43 | 25.2 | 0.0 | <u>25.2</u> | 6.2 | <u>0.0</u> | <u>68.6</u> | 0.0 | 3.7 | <u>10.2</u> | <u>980</u> |
| 44 | 0.0 | 8.1 | <u>8.1</u> | 5.1 | 0.0 | <u>86.8</u> | 0.0 | 3.3 | <u>5.2</u> | <u>1620</u> |
| 45 | 20.6 | 0.0 | <u>20.6</u> | 5.7 | 1.2 | <u>67.4</u> | 5.1 | 3.0 | <u>10.2</u> | <u>990</u> |
| 46 | 0.0 | 3.1 | <u>3.1</u> | 6.2 | 1.6 | <u>89.1</u> | 0.0 | 3.1 | 5.4 | 1560 |
| 47 | 0.0 | 0.0 | 0.0 | 6.1 | 1.6 | 92.3 | 0.0 | 3.2 | 5.5 | 1580 |
| 48 | 0.0 | 0.5 | 0.5 | 5.4 | 0.0 | 94.1 | 0.0 | 3.2 | 5.4 | 1570 |
| 49 | 0.0 | 0.0 | 0.0 | 5.4 | 0.0 | 94.6 | 0.0 | <u>4.1</u> | <u>10.2</u> | <u>980</u> |
| 50 | 11.1 | 3.5 | 14.6 | 5.3 | 0.0 | 80.1 | 0.0 | <u>3.7</u> | <u>10.1</u> | <u>990</u> |
| 51 | 0.0 | 0.4 | 0.4 | 5.2 | 0.0 | 94.4 | 0.0 | 3.5 | <u>7.4</u> | <u>1270</u> |
| 52 | 0.0 | 0.0 | 0.0 | 5.2 | 0.0 | 94.8 | 0.0 | 2.7 | 5.3 | 1590 |
| 53 | 8.4 | 4.3 | 12.7 | 5.2 | 0.0 | 81.0 | 1.1 | 3.0 | 5.2 | 1590 |
| 54 | 6.2 | 2.6 | 8.8 | 5.4 | 0.0 | 85.2 | 0.6 | 3.3 | 5.3 | 1590 |
| 55 | 6.3 | 2.9 | 9.2 | 5.5 | 0.0 | 85.3 | 0.0 | 3.6 | 7.6 | 1240 |
| 56 | 0.0 | 0.0 | 0.0 | 5.1 | 0.0 | 94.9 | 0.0 | 3.0 | 5.1 | 1580 |
| 57 | 4.6 | 2.3 | 6.9 | 5.6 | 0.0 | 87.5 | 0.0 | 3.5 | 7.4 | 1250 |
| 58 | 2.0 | 1.1 | 3.1 | 5.4 | 0.0 | 91.5 | 0.0 | 3.0 | 5.2 | 1530 |
| 59 | 3.2 | 1.6 | 4.8 | 5.4 | 0.0 | 89.8 | 0.0 | 2.8 | 5.4 | 1580 |

TABLE 3-2-continued

¼ t portion

| | Metal structure (% corresponds to % by volume) | | | | | | Texture | | |
|---|---|---|---|---|---|---|---|---|---|
| Test No. | Ferrite (%) | Bainite (%) | Total of ferrite and bainite (%) | Residual austenite (%) | Martensite (%) | Tempered martensite (%) | Remainder (%) | Maximum random specific intensity | Average diameter of region which has orientation within 10° from orientation in which random specific intensity is maximized (μm) | Surface density of region which has orientation within 10° from orientation in which random specific intensity is maximized (pieces/mm²) |
| 60 | 6.2 | 2.9 | 9.1 | 5.3 | 0.0 | 83.4 | 2.2 | 2.9 | 5.5 | 1570 |
| 61 | 2.2 | 0.8 | 3.0 | 5.3 | 0.0 | 91.7 | 0.0 | 3.2 | 5.3 | 1550 |
| 62 | 0.6 | 0.0 | 0.6 | 5.5 | 0.0 | 93.9 | 0.0 | 2.8 | 5.4 | 1580 |
| 63 | 0.0 | 0.4 | 0.4 | 5.6 | 0.0 | 94.0 | 0.0 | 3.2 | 5.5 | 1590 |
| 64 | 2.4 | 0.8 | 3.2 | 5.4 | 0.0 | 91.4 | 0.0 | 2.9 | 5.3 | 1600 |
| 65 | 2.5 | 1.2 | 3.7 | 5.3 | 0.0 | 91.0 | 0.0 | 3.1 | 5.6 | 1630 |
| 66 | 2.1 | 0.8 | 2.9 | 5.4 | 0.0 | 91.7 | 0.0 | 2.9 | 5.2 | 1570 |
| 67 | 3.4 | 1.8 | 5.2 | 7.3 | 2.8 | 86.4 | 1.1 | 2.8 | 5.4 | 1610 |
| 68 | 6.9 | 4.1 | 11.0 | 5.2 | 0.0 | 83.8 | 0.0 | 3.3 | 5.8 | 1570 |
| 69 | 6.4 | 3.8 | 10.2 | 5.5 | 0.0 | 84.3 | 0.0 | 3.2 | 5.4 | 1610 |
| 70 | 3.8 | 2.4 | 6.2 | 5.4 | 0.0 | 88.4 | 0.0 | 3.2 | 5.3 | 1610 |
| 71 | 3.6 | 2.1 | 5.7 | 5.3 | 0.0 | 89.0 | 0.0 | 3.1 | 5.5 | 1570 |
| 72 | 3.9 | 2.5 | 6.4 | 5.1 | 0.0 | 88.5 | 0.0 | 3.0 | 5.4 | 1600 |
| 73 | 3.7 | 7.8 | 11.5 | 6.5 | 0.0 | 82.0 | 0.0 | 3.2 | 5.6 | 1540 |

TABLE 4-1

| | Surface layer Texture | | |
|---|---|---|---|
| Test No. | Maximum random specific intensity | Average diameter of region which has orientation within 10° from orientation in which random specific intensity is maximized (μm) | Surface density of region which has orientation within 10° from orientation in which random specific intensity is maximized (pieces/mm²) |
| 1 | 4.3 | 10.8 | 930 |
| 2 | 4.2 | 10.2 | 970 |
| 3 | 4.3 | 10.7 | 930 |
| 4 | 4.2 | 10.2 | 960 |
| 5 | 4.3 | 10.8 | 920 |
| 6 | 4.2 | 10.1 | 950 |
| 7 | 4.4 | 10.8 | 930 |
| 8 | 4.1 | 10.2 | 980 |
| 9 | 4.4 | 10.8 | 930 |
| 10 | 4.1 | 10.2 | 960 |
| 11 | 4.1 | 10.4 | 950 |
| 12 | 4.3 | 10.5 | 940 |
| 13 | 4.5 | 10.7 | 930 |
| 14 | 4.4 | 10.8 | 920 |
| 15 | 4.5 | 10.8 | 920 |
| 16 | 4.3 | 10.2 | 980 |
| 17 | 4.1 | 10.2 | 950 |
| 18 | 4.2 | 10.3 | 970 |
| 19 | 4.3 | 10.2 | 950 |
| 20 | 4.3 | 10.4 | 920 |
| 21 | 4.2 | 10.1 | 950 |
| 22 | 4.3 | 10.4 | 920 |
| 23 | 4.2 | 10.2 | 940 |
| 24 | 4.1 | 10.3 | 940 |
| 25 | 4.2 | 10.3 | 950 |
| 26 | 4.3 | 10.2 | 950 |
| 27 | 4.1 | 10.3 | 940 |
| 28 | 4.3 | 10.3 | 950 |
| 29 | 4.2 | 10.3 | 970 |
| 30 | 4.3 | 10.3 | 990 |
| 31 | 4.1 | 10.1 | 960 |
| 32 | 4.1 | 10.3 | 990 |
| 33 | 4.3 | 10.3 | 950 |
| 34 | 4.3 | 10.1 | 990 |
| 35 | 4.3 | 10.3 | 970 |
| 36 | 4.2 | 10.2 | 950 |

TABLE 4-2

| | Surface layer Texture | | |
|---|---|---|---|
| Test No. | Maximum random specific intensity | Average diameter of region which has orientation within 10° from orientation in which random specific intensity is maximized (μm) | Surface density of region which has orientation within 10° from orientation in which random specific intensity is maximized (pieces/mm²) |
| 37 | 3.8 | 10.4 | 960 |
| 38 | 3.4 | 5.6 | 1560 |
| 39 | 3.9 | 10.3 | 980 |
| 40 | 3.4 | 5.4 | 1520 |
| 41 | 3.8 | 10.2 | 970 |
| 42 | 3.3 | 5.3 | 1540 |
| 43 | 3.9 | 10.4 | 960 |
| 44 | 3.3 | 5.4 | 1560 |
| 45 | 3.9 | 10.4 | 960 |
| 46 | 4.2 | 6.4 | 1360 |
| 47 | 4.1 | 6.5 | 1380 |
| 48 | 4.1 | 10.4 | 960 |
| 49 | 4.1 | 10.3 | 960 |
| 50 | 3.7 | 10.2 | 980 |
| 51 | 3.6 | 7.5 | 1260 |
| 52 | 2.9 | 5.4 | 1560 |
| 53 | 3.0 | 5.5 | 1580 |
| 54 | 3.3 | 5.4 | 1560 |

TABLE 4-2-continued

| Test No. | Surface layer Texture Maximum random specific intensity | Average diameter of region which has orientation within 10° from orientation in which random specific intensity is maximized (μm) | Surface density of region which has orientation within 10° from orientation in which random specific intensity is maximized (pieces/mm²) |
|---|---|---|---|
| 55 | 3.7 | 7.6 | 1240 |
| 56 | 3.2 | 5.3 | 1560 |
| 57 | 3.6 | 7.7 | 1220 |
| 58 | 3.1 | 5.4 | 1540 |
| 59 | 3.0 | 5.5 | 1560 |
| 60 | 3.1 | 5.6 | 1540 |
| 61 | 3.4 | 5.4 | 1520 |
| 62 | 3.0 | 5.5 | 1540 |
| 63 | 3.3 | 5.7 | 1560 |
| 64 | 3.2 | 5.5 | 1580 |
| 65 | 3.2 | 5.7 | 1600 |
| 66 | 3.0 | 5.3 | 1560 |
| 67 | 3.1 | 5.5 | 1600 |
| 68 | 3.3 | 5.7 | 1540 |
| 69 | 3.1 | 5.3 | 1600 |
| 70 | 3.2 | 5.5 | 1540 |
| 71 | 3.0 | 5.4 | 1520 |
| 72 | 2.9 | 5.3 | 1600 |
| 73 | 3.1 | 6 | 1570 |

TABLE 5-1

| Test No. | Presence or absence of plating CR/GI/GA | TS (MPa) | Uniform elongation (%) | Hole expandability λ (%) | TS × λ (MPa · %) | Limit bending radius (R/t) | Hydrogen embrittlement resistance characteristics | Remarks |
|---|---|---|---|---|---|---|---|---|
| 1 | CR | 1205 | 5.3 | 29 | 34945 | 5.7 | OK | Comparative example |
| 2 | CR | 1562 | 4.8 | 44 | 68728 | 5.4 | NG | Comparative example |
| 3 | CR | 1305 | 7.4 | 26 | 33930 | 5.7 | OK | Comparative example |
| 4 | CR | 1970 | 6.7 | 17 | 33490 | 6.4 | NG | Comparative example |
| 5 | CR | 884 | 16.8 | 39 | 34476 | 5.4 | OK | Comparative example |
| 6 | GA | 1610 | 6.6 | 21 | 33810 | 6.1 | NG | Comparative example |
| 7 | CR | 1301 | 8.1 | 24 | 31224 | 5.4 | OK | Comparative example |
| 8 | CR | 1490 | 6.2 | 45 | 67050 | 5.4 | NG | Example |
| 9 | GA | 1302 | 7.6 | 22 | 28644 | 5.4 | NG | Comparative example |
| 10 | CR | 1456 | 6.3 | 24 | 34944 | 2.9 | NG | Comparative example |
| 11 | GA | 1447 | 6.2 | 24 | 34728 | 2.9 | NG | Comparative example |
| 12 | CR | 1468 | 6.4 | 23 | 33764 | 3.9 | NG | Comparative example |
| 13 | CR | 1459 | 6.5 | 23 | 33557 | 5.4 | NG | Comparative example |
| 14 | CR | 1356 | 6.2 | 25 | 33900 | 5.4 | NG | Comparative example |
| 15 | CR | 1388 | 6.3 | 25 | 34700 | 5.7 | NG | Comparative example |
| 16 | CR | 1362 | 6.2 | 25 | 34050 | 5.4 | NG | Comparative example |
| 17 | CR | 1564 | 6.0 | 40 | 62560 | 5.4 | NG | Example |
| 18 | GA | 1451 | 6.3 | 34 | 49334 | 5.4 | NG | Example |
| 19 | CR | 1483 | 6.4 | 40 | 59320 | 5.7 | NG | Example |
| 20 | GA | 1375 | 6.8 | 29 | 39875 | 5.7 | NG | Example |
| 21 | CR | 1583 | 5.9 | 38 | 60154 | 5.4 | NG | Example |
| 22 | CR | 1455 | 7.1 | 29 | 42195 | 5.7 | NG | Example |
| 23 | GA | 1423 | 6.5 | 47 | 66881 | 5.4 | NG | Example |
| 24 | CR | 1471 | 6.6 | 42 | 61782 | 5.4 | NG | Example |
| 25 | CR | 1428 | 6.4 | 35 | 49980 | 5.7 | NG | Example |
| 26 | CR | 1472 | 6.5 | 40 | 58880 | 5.4 | NG | Example |
| 27 | GA | 1579 | 6.2 | 37 | 58423 | 5.4 | NG | Example |
| 28 | CR | 1366 | 7.1 | 49 | 66934 | 5.7 | NG | Example |
| 29 | CR | 1470 | 6.7 | 41 | 60270 | 5.4 | NG | Example |
| 30 | GA | 1474 | 6.4 | 42 | 61908 | 5.4 | NG | Example |
| 31 | CR | 1491 | 6.4 | 38 | 56658 | 5.4 | NG | Example |
| 32 | CR | 1845 | 6.5 | 28 | 51660 | 5.4 | NG | Example |

TABLE 5-1-continued

| Test No. | Presence or absence of plating CR/GI/GA | TS (MPa) | Uniform elongation (%) | Hole expandability λ (%) | TS × λ (MPa · %) | Limit bending radius (R/t) | Hydrogen embrittlement resistance characteristics | Remarks |
|---|---|---|---|---|---|---|---|---|
| 33 | GA | 1472 | 6.3 | 39 | 57408 | 5.7 | NG | Example |
| 34 | CR | 1498 | 6.3 | 42 | 62916 | 5.4 | NG | Example |
| 35 | GA | 1481 | 6.5 | 44 | 65164 | 5.4 | NG | Example |
| 36 | GI | 1499 | 6.3 | 43 | 64457 | 5.4 | NG | Example |

TABLE 5-2

| Test No. | Presence or absence of plating CR/GI/GA | TS (MPa) | Uniform elongation (%) | Hole expandability λ (%) | TS × λ (MPa · %) | Limit bending radius (R/t) | Hydrogen embrittlement resistance characteristics | Remarks |
|---|---|---|---|---|---|---|---|---|
| 37 | CR | 1220 | 5.4 | 30 | 34945 | 5.4 | OK | Comparative example |
| 38 | CR | 1561 | 4.7 | 45 | 68728 | 4.6 | OK | Comparative example |
| 39 | CR | 1302 | 7.3 | 26 | 33930 | 5.4 | OK | Comparative example |
| 40 | CR | 1977 | 6.5 | 18 | 33490 | 6.1 | NG | Comparative example |
| 41 | CR | 890 | 16.5 | 41 | 34476 | 5.4 | OK | Comparative example |
| 42 | GA | 1620 | 6.5 | 23 | 33810 | 6.1 | NG | Comparative example |
| 43 | CR | 1308 | 7.8 | 25 | 31224 | 3.9 | OK | Comparative example |
| 44 | CR | 1497 | 6.3 | 46 | 68862 | 2.5 | OK | Example |
| 45 | GA | 1306 | 7.4 | 24 | 31344 | 5.4 | OK | Comparative example |
| 46 | CR | 1461 | 6.3 | 45 | 65745 | 5.4 | NG | Example |
| 47 | GA | 1457 | 6.3 | 42 | 61194 | 5.4 | NG | Example |
| 48 | CR | 1466 | 6.2 | 43 | 63038 | 5.4 | NG | Example |
| 49 | GA | 1457 | 6.4 | 24 | 34968 | 5.4 | NG | Comparative example |
| 50 | CR | 1364 | 6.3 | 25 | 34100 | 5.4 | NG | Comparative example |
| 51 | GA | 1563 | 6.1 | 29 | 45327 | 4.3 | OK | Example |
| 52 | CR | 1557 | 6.1 | 42 | 65394 | 2.5 | OK | Example |
| 53 | GA | 1455 | 6.2 | 44 | 64020 | 2.9 | OK | Example |
| 54 | CR | 1478 | 6.3 | 44 | 65032 | 2.5 | OK | Example |
| 55 | GA | 1380 | 6.5 | 30 | 41400 | 4.3 | OK | Example |
| 56 | CR | 1576 | 6.0 | 40 | 63040 | 2.1 | OK | Example |
| 57 | CR | 1461 | 6.9 | 29 | 42369 | 4.3 | OK | Example |
| 58 | GA | 1432 | 6.6 | 46 | 65872 | 2.9 | OK | Example |
| 59 | CR | 1465 | 6.5 | 44 | 64460 | 2.5 | OK | Example |
| 60 | CR | 1446 | 6.3 | 45 | 65070 | 2.9 | OK | Example |
| 61 | GA | 1478 | 6.4 | 43 | 63554 | 2.5 | OK | Example |
| 62 | GA | 1570 | 6.3 | 39 | 61230 | 2.1 | OK | Example |
| 63 | CR | 1380 | 7.2 | 48 | 66240 | 2.9 | OK | Example |
| 64 | CR | 1476 | 6.6 | 42 | 61992 | 2.5 | OK | Example |
| 65 | GA | 1475 | 6.4 | 43 | 63425 | 2.5 | OK | Example |
| 66 | CR | 1488 | 6.3 | 37 | 55056 | 2.5 | OK | Example |
| 67 | CR | 1850 | 6.4 | 29 | 53650 | 3.9 | OK | Example |
| 68 | GA | 1474 | 6.2 | 40 | 58960 | 3.2 | OK | Example |
| 69 | CR | 1492 | 6.1 | 43 | 64156 | 3.2 | OK | Example |
| 70 | GA | 1488 | 6.4 | 45 | 66960 | 2.5 | OK | Example |
| 71 | GI | 1486 | 6.4 | 44 | 65384 | 2.9 | OK | Example |
| 72 | GI | 1491 | 6.3 | 45 | 67095 | 3.2 | OK | Example |
| 73 | CR | 1268 | 7.5 | 39 | 49452 | 2.9 | OK | Comparative example |

All of the steels of the present invention had TS of 1310 MPa or more, uE1 of 5.0% or more, TS×λ of 35000 MPa·% or more, and high strength and excellent formability were obtained.

Also, among the steels of the present invention, when the texture of the surface layer was preferably controlled, TS was 1310 MPa or more, uE1 was 5.0% or more, TS×λ, was 35000 MPa·% or more, the limit bending radius (R/t) was 5.0 or less, and good hydrogen embrittlement resistance characteristics are provided.

On the other hand, in the test number (comparative example) in which either the chemical composition or the production method was outside of the scope of the present invention and the metallographic structure and the texture was outside of the range of the present invention, any of the tensile strength, the uniform elongation, TS×λ did not reach the target.

INDUSTRIAL APPLICABILITY

According to the present invention, a high-strength cold-rolled steel sheet having an excellent formability in which a tensile strength (TS) is 1310 MPa or more, a uniform elongation is 5.0% or more, TS×λ is 35000 MPa·% or more, and a method for producing the same can be obtained. Since such a steel sheet has sufficient formability which can be applied to a treatment such as press molding, the present invention contributes significantly to the development of industry such as being able to contribute to solving global environment problems by reducing the weight of the vehicle body of the vehicle.

The invention claimed is:

1. A cold-rolled steel sheet, wherein
a chemical composition contains, in % by mass,
C: more than 0.140% and less than 0.400%;
Si: more than 0.35% and less than 1.50%;
Mn: more than 1.30% and less than 3.50%;
P: 0.100% or less;
S: 0.010% or less;
Al: 0.100% or less;
N: 0.0100% or less;
Ti: 0% or more and less than 0.050%;
Nb: 0% or more and less than 0.050%;
V: 0% or more and 0.50% or less;
Cu: 0% or more and 1.00% or less;
Ni: 0% or more and 1.00% or less;
Cr: 0% or more and 1.00% or less;
Mo: 0% or more and 0.50% or less;
B: 0% or more and 0.0100% or less;
Ca: 0% or more and 0.0100% or less;
Mg: 0% or more and 0.0100% or less;
Rare earth metals (REM): 0% or more and 0.0500% or less; and
Bi: 0% or more and 0.050% or less;
with the balance of Fe and impurities,
wherein a structure at a position of ¼ of a sheet thickness from a surface contains, in volume percentage,
80.0% or more of tempered martensite;
more than 2.5% and less than 10.0% of residual austenite;
0% or more and 15.0% or less of ferrite and bainite in total;
0% or more and 3.0% or less of martensite, and
the remainder structure,
in the structure,
a maximum of a random specific intensity Iq is 4.0 or less,
an average diameter of a region Rq which has an orientation within 10° from a crystal orientation in which the random specific intensity Iq is maximized is 10 μm or less,
a planar density of the region Rq is 1000 pieces/mm² or more,
a tensile strength TS is 1310 MPa or more, a uniform elongation is 5.0% or more, and a value TS×λ, which represents a product of the tensile strength TS and a hole expandability λ, is 35000 MPa·% or more,
wherein, in a structure within a range from the surface to 100 μm in a sheet thickness direction,
a maximum of a random specific intensity Is is 4.0 or less,
an average diameter of a region Rs which has an orientation within 10° from a crystal orientation in which the random specific intensity Is is maximized is 10.0 μm or less,
a planar density of the region Rs is 1000 pieces/mm² or more.

2. The cold-rolled steel sheet according to claim 1, wherein,
R/t which is a ratio of a minimum bending radius R in which cracks do not occur, in mm, at 90° V bending to a sheet thickness t, in mm, is 5.0 or less.

3. The cold-rolled steel sheet according to claim 1, wherein the tensile strength is 1400 MPa or more.

4. The cold-rolled steel sheet according to claim 1, wherein the chemical composition contains, in % by mass, one or more selected from
Ti: 0.001% or more and less than 0.050%;
Nb: 0.001% or more and less than 0.050%;
V: 0.01% or more and 0.50% or less;
Cr: 0.01% or more and 1.00% or less;
Ni: 0.01% or more and 1.00% or less;
Cu: 0.01% or more and 1.00% or less;
Mo: 0.01% or more and 0.50% or less;
B: 0.0001% or more and 0.0100% or less;
Ca: 0.0001% or more and 0.0100% or less;
Mg: 0.0001% or more and 0.0100% or less;
REM: 0.0005%% or more and 0.0500% or less; and
Bi: 0.0005%% or more and 0.050% or less.

5. The cold-rolled steel sheet according to claim 1, comprising:
a hot-dip galvanized layer on the surface.

6. The cold-rolled steel sheet according to claim 2, wherein the tensile strength is 1400 MPa or more.

7. The cold-rolled steel sheet according to claim 2, wherein the chemical composition contains, in % by mass, one or more selected from
Ti: 0.001% or more and less than 0.050%;
Nb: 0.001% or more and less than 0.050%;
V: 0.01% or more and 0.50% or less;
Cr: 0.01% or more and 1.00% or less;
Ni: 0.01% or more and 1.00% or less;
Cu: 0.01% or more and 1.00% or less;
Mo: 0.01% or more and 0.50% or less;
B: 0.0001% or more and 0.0100% or less;
Ca: 0.0001% or more and 0.0100% or less;
Mg: 0.0001% or more and 0.0100% or less;
REM: 0.0005%% or more and 0.0500% or less; and
Bi: 0.0005%% or more and 0.050% or less.

8. The cold-rolled steel sheet according to claim 2, comprising:
a hot-dip galvanized layer on the surface.

9. The cold-rolled steel sheet according to claim 3, wherein the chemical composition contains, in % by mass, one or more selected from
Ti: 0.001% or more and less than 0.050%;
Nb: 0.001% or more and less than 0.050%;
V: 0.01% or more and 0.50% or less;
Cr: 0.01% or more and 1.00% or less;
Ni: 0.01% or more and 1.00% or less;
Cu: 0.01% or more and 1.00% or less;
Mo: 0.01% or more and 0.50% or less;
B: 0.0001% or more and 0.0100% or less;
Ca: 0.0001% or more and 0.0100% or less;
Mg: 0.0001% or more and 0.0100% or less;
REM: 0.0005%% or more and 0.0500% or less; and
Bi: 0.0005%% or more and 0.050% or less.

10. The cold-rolled steel sheet according to claim 3, comprising:
a hot-dip galvanized layer on the surface.

11. The cold-rolled steel sheet according to claim 4, comprising:
a hot-dip galvanized layer on the surface.

12. The cold-rolled steel sheet according to claim 5, wherein the hot-dip galvanized layer is a hot-dip galvannealed layer.

13. A method for producing the cold-rolled steel sheet according to claim 1, the method comprising:
a hot rolling step of directly heating or once cooling and then heating a cast slab having a chemical composition which contains, in % by mass, C: more than 0.140% and less than 0.400%, Si: more than 0.35% and less than 1.50%, Mn: more than 1.30% and less than 3.50%, P: 0.100% or less, S: 0.010% or less, Al: 0.100% or less, N: 0.0100% or less, Ti: 0% or more and less than 0.050%, Nb: 0% or more and less than 0.050%, V: 0% or more and 0.50% or less, Cr: 0% or more and 1.00% or less, Ni: 0% or more and 1.00% or less, Cu: 0% or more and 1.00% or less, Mo: 0% or more and 0.50% or less, B: 0% or more and 0.0100% or less, Ca: 0% or more and 0.0100% or less, Mg: 0% or more and 0.0100% or less, REM: 0% or more and 0.0500% or less, and Bi: 0% or more and 0.050% or less, with the balance of Fe and impurities, to 1100° C. or higher, and subjecting the cast slab to hot rolling under the conditions in which a rolling temperature FT in a final stand is 920° C. or higher and, in the final stand, a rolling reduction ratio is 15% or less and a friction coefficient μ is 0.15 or more to obtain a hot-rolled steel sheet;
a cooling step of cooling the hot-rolled steel sheet so that the hot-rolled steel sheet passes in a temperature range of 750° C. to 650° C. within 10 seconds;
a coiling step of coiling the hot-rolled steel sheet which has been subjected to the cooling step at 650° C. or lower;
a cold rolling step of subjecting the hot-rolled steel sheet which has been subjected to the coiling step to pickling and subjecting the hot-rolled steel sheet to cold rolling at a cumulative rolling reduction ratio of 60% or less to obtain a cold-rolled steel sheet;
an annealing step of heating the cold-rolled steel sheet at an average heating rate of 1.0° C./s or higher and 50.0° C./s or lower from 550° C. to 750° C. and subjecting the cold-rolled steel sheet to soaking at 820° C. or higher;
a cooling after annealing step of cooling the cold-rolled steel sheet which has been subjected to the annealing step to a temperature of 50° C. or higher and 250° C. or lower so that an average cooling rate in a temperature range of 700° C. to 600° C. and a temperature range of 450° C. to 350° C. is 5° C./s or higher; and
a tempering step of tempering the cold-rolled steel sheet which has been subjected to the cooling after annealing step in a temperature range of 200° C. or higher and lower than 350° C. for 1 second or longer.

14. The method for producing a cold-rolled steel sheet according to claim 13, wherein in the hot rolling step, the hot rolling is performed under the conditions in which the rolling temperature FT in the final stand is 920° C. or higher and 960° C. or lower, the rolling reduction ratio is 10% or more and 15% or less; and
in the annealing step, the cold-rolled steel sheet is heated at an average heating rate of 3.0° C./s or higher and 50.0 C/s or lower from 550° C. to 750° C. and the cold-rolled steel sheet is subjected to soaking at 820° C. or higher.

15. The method for producing a cold-rolled steel sheet according to claim 13, wherein in the cooling after annealing step, the cold-rolled steel sheet which has been subjected to the annealing step is cooled to a temperature of 50° C. or higher and lower than 220° C. so that an average cooling rate in a temperature range of 700° C. to 600° C. and a temperature range from 450° C. to 350° C. is 5° C./s or higher.

16. The method for producing a cold-rolled steel sheet according to claim 13, wherein the chemical composition contains, in % by mass, one or more selected from Ti: 0.001% or more and less than 0.050%, Nb: 0.001% or more and less than 0.050%, V: 0.01% or more and 0.50% or less, Cr: 0.01% or more and 1.00% or less, Ni: 0.01% or more and 1.00% or less, Cu: 0.01% or more and 1.00% or less, Mo: 0.01% or more and 0.50% or less, B: 0.0001% or more and 0.0100% or less, Ca: 0.0001% or more and 0.0100% or less, Mg: 0.0001% or more and 0.0100% or less, REM: 0.0005%% or more and 0.0500% or less, and Bi: 0.0005%% or more and 0.050% or less.

17. The method for producing a cold-rolled steel sheet according to claim 13, wherein the cooling after annealing step further includes: subjecting the steel sheet to hot dip galvanizing in a temperature range of higher than 450° C. and lower than 600° C. and optionally subjecting the steel sheet to an alloy treatment.

18. The method for producing a cold-rolled steel sheet according to claim 14, wherein in the cooling after annealing step, the cold-rolled steel sheet which has been subjected to the annealing step is cooled to a temperature of 50° C. or higher and lower than 220° C. so that an average cooling rate in a temperature range of 700° C. to 600° C. and a temperature range from 450° C. to 350° C. is 5° C./s or higher.

19. The method for producing a cold-rolled steel sheet according to claim 14, wherein the chemical composition contains, in % by mass, one or more selected from Ti: 0.001% or more and less than 0.050%, Nb: 0.001% or more and less than 0.050%, V: 0.01% or more and 0.50% or less, Cr: 0.01% or more and 1.00% or less, Ni: 0.01% or more and 1.00% or less, Cu: 0.01% or more and 1.00% or less, Mo: 0.01% or more and 0.50% or less, B: 0.0001% or more and 0.0100% or less, Ca: 0.0001% or more and 0.0100% or less, Mg: 0.0001% or more and 0.0100% or less, REM: 0.0005%% or more and 0.0500% or less, and Bi: 0.0005%% or more and 0.050% or less.

20. The method for producing a cold-rolled steel sheet according to claim 15, wherein the chemical composition contains, in % by mass, one or more selected from Ti: 0.001% or more and less than 0.050%, Nb: 0.001% or more and less than 0.050%, V: 0.01% or more and 0.50% or less, Cr: 0.01% or more and 1.00% or less, Ni: 0.01% or more and 1.00% or less, Cu: 0.01% or more and 1.00% or less, Mo: 0.01% or more and 0.50% or less, B: 0.0001% or more and 0.0100% or less, Ca: 0.0001% or more and 0.0100% or less, Mg: 0.0001% or more and 0.0100% or less, REM: 0.0005%% or more and 0.0500% or less, and Bi: 0.0005%% or more and 0.050% or less.

\* \* \* \* \*